US012532174B2

(12) United States Patent
Hsu et al.

(10) Patent No.: US 12,532,174 B2
(45) Date of Patent: Jan. 20, 2026

(54) USING A PASSPHRASE WITH Wi-Fi PROTECTED ACCESS 3

(71) Applicant: Ruckus IP Holdings LLC, Claremont, NC (US)

(72) Inventors: Wei-Sheng Hsu, San Jose, CA (US); Yu-Ting Chang, Taipei (TW); Weichih Huang, Taipei (TW); Kuan-Hsun Peng, Taipei (TW); Weiguo Xie, Taipei (TW); Christopher Mohammed, Whitby (CA); Shannon Moyes Clark, Loveland, CO (US); Siddhartha Datta, Broomfield, CO (US); David Burns, San Francisco, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 139 days.

(21) Appl. No.: 18/461,821

(22) Filed: Sep. 6, 2023

(65) Prior Publication Data
US 2024/0098492 A1    Mar. 21, 2024

Related U.S. Application Data

(60) Provisional application No. 63/408,487, filed on Sep. 21, 2022.

(51) Int. Cl.
*H04W 12/065*  (2021.01)
*H04W 12/086*  (2021.01)

(52) U.S. Cl.
CPC ....... *H04W 12/065* (2021.01); *H04W 12/086* (2021.01)

(58) Field of Classification Search
CPC . H04W 12/065; H04W 12/086; H04W 88/10; H04W 92/10; H04W 12/08; H04W 12/50; H04W 84/12; H04W 12/069; H04L 63/101; H04L 63/0892
See application file for complete search history.

(56) References Cited

U.S. PATENT DOCUMENTS

| 11,284,258 | B1 * | 3/2022 | Wei | H04L 63/10 |
| 2017/0353454 | A1 * | 12/2017 | Cooper | H04L 63/10 |
| 2021/0075618 | A1 * | 3/2021 | Stephenson | H04L 63/0846 |

(Continued)

OTHER PUBLICATIONS

"Communication with European Search Report", EP Application No. 23198651.4, Nov. 9, 2023, 8 pp.

*Primary Examiner* — Amie C. Lin
(74) *Attorney, Agent, or Firm* — Steven Stupp

(57) ABSTRACT

During operation, an access point may provide a first WLAN and a second WLAN, where the first WLAN uses a WPA2-compatible authentication protocol and the second WLAN uses a WPA3-compatible authentication protocol. In response to an association request or a probe request associated with (or from) an electronic device, the access point may establish a connection with the electronic device using the first WLAN. Then, the access point may confirm, with a computer system, that a binding between a passphrase associated with the electronic device and the second WLAN exists. Alternatively, when the binding does not exist, the access point may establish the binding in the computer system. Next, the access point may perform a BSS transition of the electronic device from the first WLAN to the second WLAN.

20 Claims, 21 Drawing Sheets

(56) References Cited

U.S. PATENT DOCUMENTS

| | | | |
|---|---|---|---|
| 2022/0294625 A1* | 9/2022 | Choi | H04L 9/0861 |
| 2022/0330136 A1* | 10/2022 | Siraj | H04W 48/12 |
| 2024/0022994 A1* | 1/2024 | Pan | H04W 40/22 |
| 2024/0121607 A1* | 4/2024 | Yoshikawa | H04W 12/50 |

* cited by examiner

USING A PASSPHRASE WITH Wi-Fi PROTECTED ACCESS 3

CROSS REFERENCE TO RELATED APPLICATIONS

This application claims priority under 35 U.S.C. 119(e) to U.S. Provisional Application Ser. No. 63/408,487, "Using a Passphrase with Wi-Fi Protected Access 3," filed on Sep. 21, 2023, by Christopher Mohammed, et al. the contents of which are herein incorporated by reference.

FIELD

The described embodiments relate to techniques for using a passphrase when authenticating one or more devices to a network that is protected or secured using Wi-Fi Protected Access 3 (WPA3).

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

One challenge associated with Wi-Fi is how to securely authenticate an electronic device before allowing it to establish a connection in a WLAN. Notably, because of vulnerabilities of existing security protocols (such as WPA or WPA2), many WLAN are transitioning to WPA3, which offers enhanced security or protection.

Moreover, many WLANs use passphrases (such as a dynamic pre-shared key or DPSK) to provide users a convenient way to distribute cryptographic information that allows the users to securely establish connections to personal area networks (PANs) in the WLANs. However, DPSKs are currently incompatible with WPA3. Consequently, the improvements in security or protection offered by WPA3 may inconvenience users, and thus may make onboarding of electronic devices to PANs more complicated, cumbersome and time-consuming.

SUMMARY

In a first group of embodiments, an access point (and, more generally, a computer network device) is described. This access point may include: an interface circuit that communicates with an electronic device, a computer system, and/or additional access points in a network; a processor; and a memory that stores program instructions, where, when executed by the processor, the program instructions cause the computer to perform operations. Notably, during operation, the access point provides a first WLAN and a second WLAN, where the first WLAN uses a WPA2-compatible authentication protocol and the second WLAN uses a WPA3-compatible authentication protocol. In response to an association request or a probe request associated with (or from) the electronic device, the access point establishes a connection with the electronic device using the first WLAN. Then, the access point confirms, with the computer system, that a binding between a passphrase associated with the electronic device and the second WLAN exists. Alternatively, when the binding does not exist, the access point establishes the binding in the computer system. Next, the access point performs a BSS transition of the electronic device from the first WLAN to the second WLAN.

Note that the access point may update a state entry associated with the electronic device in a state table when the binding is confirmed or is established.

Moreover, the access point may communicate the state entry to the additional access points. For example, the state entry may be communicated using a layer-two (L2) broadcast to the additional access points.

Furthermore, the connection with the electronic device may be established using the first WLAN when the connection includes a first instance of the connection. The access point may confirm that an association with the electronic device is the first instance based at least in part on the state entry in the state table. Consequently, when a request to establish a subsequent instance of a connection with the electronic device occurs, the access point may establish the subsequent instance of the connection with the electronic device using the second WLAN based at least in part on the state entry in the state table.

Similarly, when the electronic device subsequently associates with one of the additional access points, a connection may be established with the instance of the one of the additional access points using an instance of the second WLAN provided by the instance of the one of the additional access points. Thus, the second WLAN may be used when the electronic device roams from the access point to the instance of the one of the additional access points.

Additionally, the second WLAN may use WPA3-simultaneous authentication of equals (SAE).

In some embodiments, the first WLAN and the second WLAN may have the same service set identifier (SSID) and different basic service set identifiers (BSSIDs).

Note that the BSS transition may be based at least in part on the association of the electronic device and the access point using the first WLAN.

Moreover, the passphrase may include a DPSK of the electronic device.

Furthermore, the confirming of the binding or the establishing of the binding may include the computer system authenticating the electronic device and may occur without the computer system performing a cryptographic calculation or using a single cryptographic calculation.

Another embodiment provides the electronic device that performs counterpart operations to at least some of the aforementioned operations of the access point.

Another embodiment provides one of the additional access points that performs counterpart operations to at least some of the aforementioned operations of the access point.

Another embodiment provides the computer system.

Another embodiment provides a system that includes the access point, the computer system, and/or the additional access points.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

In a second group of embodiments, a computer is described. This computer may include: an interface circuit that communicates with a computer network device and an electronic device; a processor; and a memory that stores program instructions, where, when executed by the processor, the program instructions cause the computer to perform operations. Notably, during operation, the computer establishes a binding between a passphrase associated with an electronic device that accesses a network secured using WPA or WPA2 and/or a second network secured using WPA3, where the binding is based at least in part on an identifier associated with the electronic device. Then, the computer receives an access request associated with the electronic device and via the computer network device, where the access request is for the electronic device to join the second network, and the access request is compatible with WPA3 and includes a second identifier. Moreover, the computer selectively performs authentication of the electronic device, where the selective performing is based at least in part on the identifier and the second identifier, and the authentication is based at least in part on the binding, the second identifier and the passphrase. Next, when the authentication is successful, the computer provides, addressed to the electronic device and via the computer network device, an access acceptance message, where the access acceptance message is intended for the electronic device and includes information for establishing the secure access of the electronic device to the second network, and the access acceptance message is compatible with WPA3.

By establishing the binding, the computer may authenticate the electronic device without the computer performing a cryptographic calculation. Alternatively, only a single cryptographic calculation may need to be performed for the electronic device (as opposed to a brute-force search through a larger set of possible passphrases).

Note that the network and the second network may have different service set identifiers (SSIDs).

Moreover, the computer network device may include an access point, a router or a switch.

Furthermore, the identifier may include a media access control (MAC) address and the second identifier may include a second MAC address.

Additionally, when the second identifier includes a dynamic MAC address (and, thus, when the second identifier is different from the identifier), instead of authenticating the electronic device based at least in part on the passphrase, the computer may have the electronic device join the network, where joining the network involves performing second authentication of the electronic device based at least in part on the passphrase, and performing the second authentication involves second communication with the electronic device via the computer network device, and the second communication is compatible with WPA2. Notably, during the second authentication, the computer may receive, associated with the electronic device and via the computer network device, passphrase parameters corresponding to the passphrase, where the passphrase parameters include inputs to the cryptographic calculation and an output of the cryptographic calculation. In response, the computer may calculate one or more second outputs of the cryptographic calculation based at least in part on the inputs and at least the passphrase. Moreover, when there is a match between one of the one or more second outputs and the output, the computer may access a policy associated with the electronic device. Then, when one or more criteria associated with the policy are met, the computer may deem the second authentication successful. Furthermore, the computer may establish a second binding of between the passphrase associated with the electronic device of the network and the second network, where the second binding is based at least in part on the second identifier. Next, when the second authentication is successful, the computer may allow the electronic device to join the second network.

Note that the passphrase parameters may include: a random number associated with the electronic device, a random number associated with the computer network device, the output of the cryptographic calculation, the identifier of the electronic device (such as MAC address), and/or an identifier of the computer network device (such as a MAC address of the computer network device). In some embodiments, the passphrase parameters may be included in a remote authentication dial-in user service (RADIUS) attribute, such as a vendor specific attribute (VSA). Alternatively, in some embodiments, a hypertext transfer protocol (HTTP) or HTTP-based protocol (such as HTTPv2, websockets or gRPC) may be used.

Moreover, the policy may include a time interval when the passphrase is valid. In some embodiments, the policy may include a location where the passphrase is valid (such as a location of the computer network device) or the network that the electronic device is allowed to access. For example, the interface circuit may communicate with a second computer (such as a property management or PM server associated with an organization) to determine whether the electronic device is associated with the location. When the electronic device is associated with the location, the computer may selectively provide the access acceptance message. Note that the location may include: a room, a building, a communication port, a facility associated with the organization (such as a hotel or an education institution), etc.

Alternatively or additionally, when the network and the second network have the same SSID, instead of authenticating the electronic device based at least in part on the passphrase, the computer may have the electronic device join the network, where joining the network involves performing second authentication of the electronic device based at least in part on the passphrase, and performing the second authentication involves second communication with the electronic device via the computer network device, and the second communication is compatible with WPA2. Then, when the second authentication is successful, the computer may allow the electronic device to join the second network.

In some embodiments, establishing the binding may involve: providing, addressed to the electronic device and via the computer network device, an address of a registration portal; and receiving, associated with the electronic device, the identifier.

Note that the binding may be established prior to the computer receiving the access request.

Moreover, the identifier may be the same as the second identifier. In some embodiments, when this occurs, instead of authenticating the electronic device based at least in part on the passphrase, the computer may have the electronic device join the network, where joining the network involves performing second authentication of the electronic device based at least in part on the passphrase, and the performing second authentication involves second communication with the electronic device via the computer network device, and the second communication is compatible with WPA2. Then, when the second authentication is successful, the computer may allow the electronic device to join the second network.

Furthermore, the computer may include a controller of the computer network device or an authentication, authorization, and accounting (AAA) server.

Additionally, the passphrase may include a DPSK of the electronic device.

In some embodiments, the access request may include a RADIUS access request and the access acceptance message may include a RADIUS access acceptance message.

Moreover, the network and the second network may include a WLAN or a virtual network that may be associated with a location (such as a virtual network for a PAN). Note that the virtual network may include: a virtual local area network (VLAN) or a virtual extensible local area network (VXLAN).

Another embodiment provides the electronic device that performs counterpart operations to at least some of the aforementioned operations of the computer.

Another embodiment provides the computer network device that performs counterpart operations to at least some of the aforementioned operations of the computer.

Another embodiment provides a system that includes the computer network device, the computer, and/or the electronic device.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
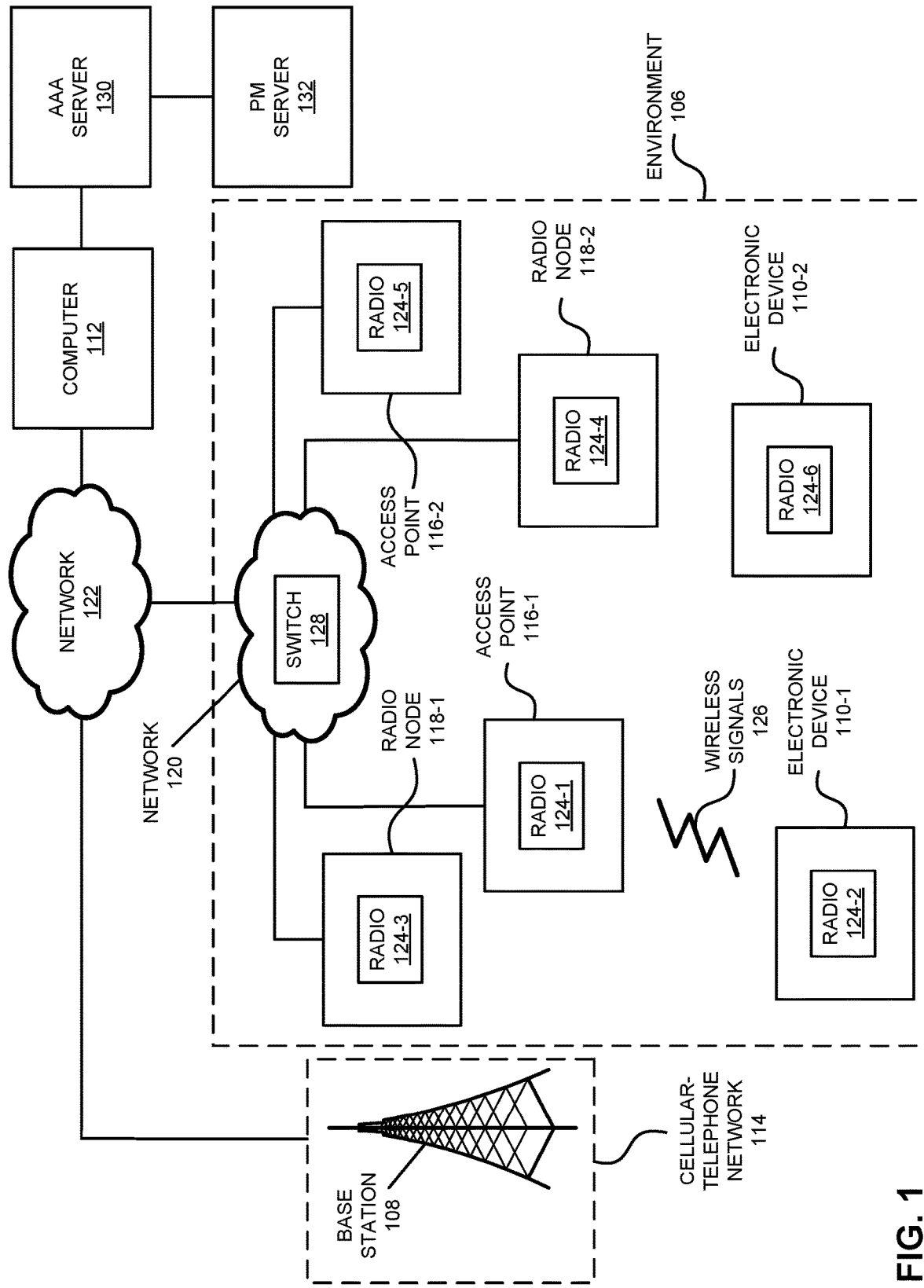
FIG. 1 is a block diagram illustrating an example of communication among electronic devices in accordance with an embodiment of the present disclosure.

In a first group of embodiments, an access point (and, more generally, a computer network device, such as an access point, a router or a switch) is described. During operation, the access point may provide a first WLAN and a second WLAN, where the first WLAN uses a WPA2-compatible authentication protocol and the second WLAN uses a WPA3-compatible authentication protocol. In response to an association request or a probe request associated with (or from) an electronic device, the access point may establish a connection with the electronic device using the first WLAN. Then, the access point may confirm, with a computer system, that a binding between a passphrase (such as a DPSK) associated with the electronic device and the second WLAN exists. Alternatively, when the binding does not exist, the access point may establish the binding in the computer system. Next, the access point may perform a BSS transition of the electronic device from the first WLAN to the second WLAN.

By initially establishing the connection using the first WLAN, these communication techniques may enable secure access to a network based at least in part on the passphrase and/or a policy. This may allow dynamic secure access to the network, such as access at one or more locations and/or at different times. Moreover, the communication techniques may not require a cryptographic calculation to be performed when selectively performing the authentications. Consequently, the communication techniques may provide more secure communication (via the WPA3-compatible authentication protocol, e.g., in a 6 GHz band of frequencies) while allowing passphrases to still be used, thereby providing convenience and efficiency. Therefore, the communication techniques may enhance the user experience when communicating in the network.

In a second group of embodiments, a computer the selectively provides an access acceptance message is described. During operation, the computer may establish a binding between a passphrase associated with an electronic device that accesses a network secured using WPA or WPA2 and/or a second network secured using WPA3, where the binding is based at least in part on an identifier associated with an electronic device. Then, the computer may receive an access request associated with the electronic device and via a computer network device, where the access request is for the electronic device to join the second network, and the access request is compatible with WPA3 and includes a second identifier. Moreover, the computer may selectively perform authentication of the electronic device, where the selective performing is based at least in part on the identifier and the second identifier, and the authentication is based at least in part on the binding, the second identifier and the passphrase. Next, when the authentication is successful, the computer may provide, addressed to the electronic device and via the computer network device, the access acceptance message, where the access acceptance message is intended for the electronic device and includes information for establishing the secure access of the electronic device to the second network, and the access acceptance message is compatible with WPA3.

By selectively performing the authentication while using communication that is compatible with WPA3, these communication techniques may enable conditional access to the network. For example, the communication techniques may allow secure access by the electronic device to the second network based at least in part on a passphrase (such as a DPSK passphrase) and the policy. This may allow dynamic secure access to the network, such as access at one or more locations and/or at different times. Moreover, the communication techniques may not require a cryptographic calculation to be performed when selectively performing the authentications. Consequently, the communication techniques may provide more secure communication (via WPA3, e.g., in a 6 GHz band of frequencies) while allowing passphrases to still be used, thereby providing convenience and efficiency. Therefore, the communication techniques may enhance the user experience when communicating in the second network.

In the discussion that follows, electronic devices or components in a system communicate packets in accordance with a wireless communication protocol, such as: a wireless communication protocol that is compatible with an IEEE 802.11 standard (which is sometimes referred to as WiFi®, from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer 112 (which may be a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 21:
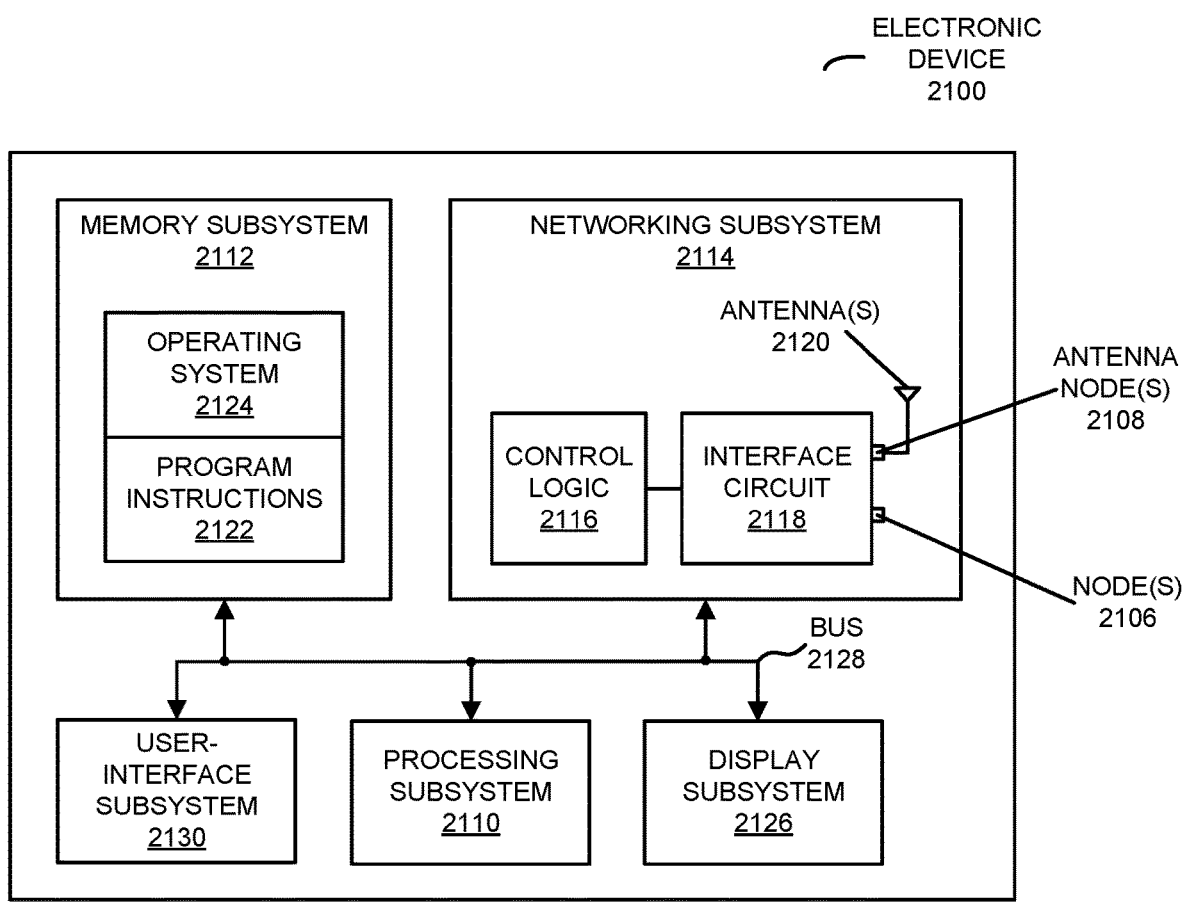
FIG. 21 is a block diagram illustrating an example of an electronic device in accordance with an embodiment of the present disclosure.

As described further below with reference to FIG. 21, electronic devices 110, computer 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to establish secure communication, e.g., in PANs. For example, when each of electronic devices 110 has a separate passphrase, complicated and time-consuming onboarding process and passphrase management may be needed. Moreover, it can be difficult to adapt or change the access criteria for one or more of the electronic devices 110.

As described further below with reference to FIGS. 2-5, in order to address these problems, an electronic device (such as access point 116-1, radio node 118-1 or switch 128) may provide secure communication to one or more electronic devices (such as electronic devices 110-1 or electronic devices 110-1 and 110-2), which may have an associated passphrase (or which may share a common passphrase). In the discussion that follows, access point 116-1 is used to illustrate the communication techniques.

During operation, an electronic device 110-1 may discover and associate with access point 116-1 (and, thus, with a network, such as a WLAN and/or network 120, provided by access point 116-1). For example, electronic device 110-1 may provide an authentication request to access point 116-1. Then, access point 116-1 may provide a user-equipment context request to computer 112. As described further below, computer 112 may subsequently provide a user-equipment context response to access point 116-1, which may confirm that there is not an existing context or association for electronic device 110-1 in the WLAN.

Moreover, access point 116-1 may provide an authentication response to electronic device 110-1. Next, electronic device 110-1 may provide an association request to access point 116-1, which may respond by providing an association response to electronic device 110-1. Note that, at this point there is a connection between electronic device 110-1 and access point 116-1, but the communication is not encrypted. Furthermore, computer 112 may provide the user-equipment context response to access point 116-1, such as a negative acknowledgment or NACK.

After associating with electronic device 110-1, access point 116-1 may provide a first message in a four-way handshake with electronic device 110-1. This first message may include a random number associated with access point 116-1 (which is sometimes referred to as an 'ANonce'). In response, electronic device 110-1 may construct, derive or generate a pairwise transient key (PTK). For example, the PTK may be constructed or generated using a cryptographic calculation (such as a pseudo-random function) and a pre-shared key (such as a passphrase, e.g., a DPSK or another type of digital certificate) the ANonce, a second random number associated with electronic device 110-1 (which is sometimes referred to as an 'SNonce'), an identifier of access point 116-1 (such as a MAC address of access point 116-1), and/or an identifier of electronic device 110-1 (such as a MAC address of electronic device 110-1). The passphrase may be preinstalled or preconfigured on electronic device 110-1 and may be stored in memory that is accessible by AAA server 130. In some embodiments, a user of electronic device 110-1 may receive the passphrase and install it on electronic device 110-1 using a portal (such as website or web page), an email, an SMS message, etc.

Note that the passphrase may be independent of an identifier associated with electronic device 110-1, such as the MAC address of electronic device 110-1. More generally, the passphrase may be independent of electronic device 110-1 or hardware in electronic device 110-1. The passphrase may be associated with a location, such as a room, a building, a communication port (such as a particular Ethernet port), etc. (In general, in the present discussion a 'location' may not be restricted to a physical location, but may be abstracted to include an object or entity associated with a physical location, such as a particular room or building.) Alternatively or additionally, the passphrase may be associated with one or more users, such as a guest or family in a hotel. Thus, as noted previously, in some embodiments, the passphrase includes a common passphrase that is shared by a group of electronic devices (e.g., the common passphrase may be a group DPSK).

Furthermore, electronic device 110-1 may provide a second message in the four-way handshake to access point 116-1. The second message may include the SNonce and a message integrity check (MIC) to access point 116-1. In some embodiments, the second message includes: the inputs to the cryptographic calculation and an output of the cryptographic calculation.

Additionally, access point 116-1 may provide an access request to computer 112 (such as a RADIUS access request), and computer 112 may provide the access request to AAA server 130 (such as a RADIUS access request). In some embodiments, the access request includes passphrase parameters associated with the user. (Therefore, in some embodiments, the passphrase parameters may be included in a RADIUS attribute, such as a VSA, e.g., Ruckus VSA 153.) The passphrase parameters may include: the inputs to the cryptographic calculation and an output of the cryptographic calculation. For example, the passphrase parameters may include: the ANonce, the SNonce, the MIC, the MAC address of electronic device 110-1, and/or the MAC address of access point 116-1. In addition, the access request may include other information, such as: a cluster name, a zone name, a service set identifier (SSID) of the WLAN, a basic service set identifier (BSSID) of access point 116-1, and a username of the user.

Based at least in part on the passphrase parameters, AAA server 130 may perform authentication and authorization, including comparing cryptographic information specified by the passphrase with stored information (such as the DPSK or the other type of digital certificate) for electronic device 110-1. More generally, AAA server 130 may use information specified by the passphrase to determine whether electronic device 110-1 is authorized to access network 120 and/or network 122. In some embodiments, AAA server 130 implements or uses a RADIUS protocol. Alternatively, in some embodiments, HTTP or HTTP-based protocol (such as HTTPv2, websockets or gRPC) may be used.

Notably, AAA server 130 may perform brute-force calculations of outputs of the cryptographic calculation based at least in part on the inputs to the cryptographic calculation and different stored passphrases. When there is a match between one of these calculated outputs and the output received from electronic device 110-1, it may confirm that AAA server 130 is able to construct, derive or generate the same PTK as electronic device 110-1, so that electronic device 110-1 and access point 116-1 will be able to encrypt and decrypt their communication with each other.

Then, AAA server 130 may access a policy associated with the user (e.g., by performing a look up based at least in part on an identifier of the user, such as a username of the user) that governs the access to WLAN (and, more generally, to network 120 and/or network 122). For example, the policy may include the policy may include a time interval when the passphrase is valid. Moreover, the policy may include a location where the passphrase is valid (such as a location of access point 116-1) or the network that the user is allowed to access. In some embodiments, AAA server 130 may communicate with property management (PM) server 132, which is associated with an organization, to determine whether electronic device 110-1 is associated with the location (such as whether a user of electronic device 110-1 is checked into or associated with a room where access point 116-1 is located). Note that the location may include: a room, a building, a communication port, a facility associated with the organization (such as a hotel or an education institution), etc. More generally, AAA server 130 may optionally communicate with PM server 132 to determine whether one or more criteria associated with the policy are met Then, when one or more criteria associated with the policy are met, AAA server 130 may selectively provide an access acceptance message to computer 112 (such as a RADIUS access acceptance message). This access acceptance message may be intended for electronic device 110-1 and may include information for establishing secure access of electronic device 110-1. For example, the access acceptance message may include: an identifier of electronic device 110-1, a tunnel type, a tunnel medium type, a tunnel privilege group identifier, a filter identifier, and the username.

In response, computer 112 may provide the access acceptance message (such as a RADIUS access acceptance message) to access point 116-1. Next, access point 116-1 may provide a third message in the four-way handshake to electronic device 110-1. Furthermore, electronic device 110-1 may provide a fourth message in the four-way handshake to access point 116-1, such as an acknowledgment. At this point, access point 116-1 may establish secure access to the WLAN for electronic device 110-1 (and, more generally, secure access to network 120 and/or network 122, such as an intranet or the Internet). Notably, the secure access may be in a PAN in the WLAN, which is independent of traffic associated with other PANs in the WLAN.

In some embodiments, the secure access may be implemented using a virtual network associated with the location (such as a virtual network for the PAN), and the information in the access acceptance message may allow electronic device 110-1 to establish secure communication with the virtual network. This secure communication may be independent of traffic associated with other users of the WLAN. For example, access point 116-1 may bridge traffic between electronic device 110-1 and another member of a group of electronic devices (such as electronic device 110-2) in the virtual network in the WLAN, where the traffic in the virtual network is independent of other traffic associated with one or more different virtual networks in the network. Note that the virtual network may include a VLAN. Alternatively, when the aforementioned operations of access point 116-1 are performed by switch 128, the virtual network may include a VXLAN. In these embodiments, switch 128 may bridge wired traffic (such as Ethernet frames) associated with electronic device 110-1 in virtual network.

Moreover, the virtual network may be specified by an identifier that is included in the access acceptance message. For example, the identifier may include a VLANID (for use with access point 116-1) or a VNI (for use with switch 128). Moreover, the identifier may include information that is capable of specifying more than 4,096 virtual networks. In some embodiments, the identifier may include 24 bits, which can be used to specify up to 16 million virtual networks.

In some embodiments, the virtual network is implemented in a virtual dataplane in access point 116-1 (such as using a generic routing encapsulation or GRE tunnel). Note that a dataplane is generally responsible for moving data around transmit paths, while a control plane is generally responsible for determining and setting up those transmit paths. The dataplane may be implemented using virtual machines that are executed by multiple cores in one or more processors (which is sometimes referred to as a 'virtual dataplane'), which allows the dataplane to be flexibly scaled and dynamically reconfigured. In the present discussion, a virtual machine is an operating system or application environment that is implemented using software that imitates or emulates dedicated hardware or particular functionality of the dedicated hardware.

Additionally, in some embodiments, the policy allows the user to access multiple networks at different locations (such as different geographic locations, e.g., different hotels in a hotel brand or chain). In these embodiments, the inputs used to calculate the one or more second outputs of the cryptographic calculation may include a given identifier of a given network (such as a given SSID). Moreover, the one or more stored passphrases may be organized based at least in part on identifiers of different networks. In these embodiments, related stored passphrases may be grouped based at least in part on a given network that a user is asking to join, which may reduce the computational time need by AAA server 130 to calculate the outputs for the different stored passphrases.

In this way, the communication techniques may allow AAA server 130 to selectively provide access by electronic device 110-1 to a network. Notably, the communication techniques may allow secure access by electronic device 110-1 based at least in part on the passphrase and the policy. This may allow dynamic secure access to the network, such as access at one or more locations and/or at different times. These capabilities may allow access point 116-1 to provide secure communication to one or more of electronic devices 110 without a complicated and time-consuming onboarding process or difficult passphrase management. Consequently, the communication techniques may improve the user experience when using electronic device 110-1, access point 116-1 and communicating via the network.

While the preceding discussion illustrated the communication techniques with communication between access point 116-1 (and, more generally, a computer network device) and AA server 130 mediated by computer 112, in other embodiments computer 112 may be excluded. Consequently, in some embodiments, access point 116-1 may communicate with AAA server 130 without computer 112. Moreover, while the preceding discussion illustrated the communication techniques with AAA server 130 communicating with PM server 132, in other embodiments information stored in PM server 132 is included in AAA server 130, so that PM server 132 may be excluded.

Figure 2:
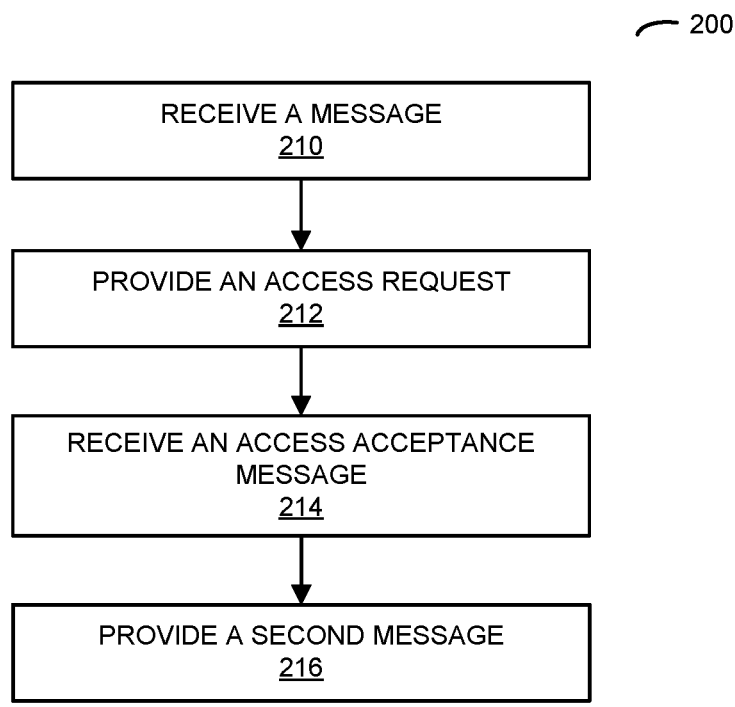
FIG. 2 is a flow diagram illustrating an example of a method for providing secure communication using an electronic device in FIG. 1 in accordance with an embodiment of the present disclosure.

We now describe embodiments of the method. FIG. 2 presents a flow diagram illustrating an example of a method 200 for providing secure communication, which may be performed by a computer network device, such as one of access points 116, one of radio nodes 118 or switch 128 in FIG. 1. During operation, the computer network device may receive a message (operation 210) from an electronic device. This message may include: a random number associated with the electronic device, a random number associated with the computer network device, an output of a cryptographic calculation, an identifier of the electronic device (such as a MAC address), and/or an identifier of the computer network device (such as a MAC address of the computer network device).

Then, the computer network device may provide an access request (operation 212) to a computer (such as a controller of the computer network device). This access request may include passphrase parameters, such as: the inputs to the cryptographic calculation and the output of the cryptographic calculation. For example, the passphrase parameters may include: the random number associated with the electronic device, the random number associated with the computer network device, the output of the cryptographic calculation, the identifier of the electronic device, and/or the identifier of the computer network device. In some embodiments, the access request includes a RADIUS access request.

Moreover, the computer network device may receive an access acceptance message (operation 214) from a computer. This access acceptance message may information for establishing secure access of the electronic device to a network. For example, the electronic device and the computer network device may use the information to encrypt/decrypt communication and/or to establish a tunnel.

Next, the computer network device may provide a second message (operation 216) to the electronic device with the information. Furthermore, the computer network device may bridge traffic (operation 218) associated with the electronic device in a virtual network in a network, where the traffic in the virtual network is independent of other traffic associated with one or more different virtual networks in the network.

Figure 3:
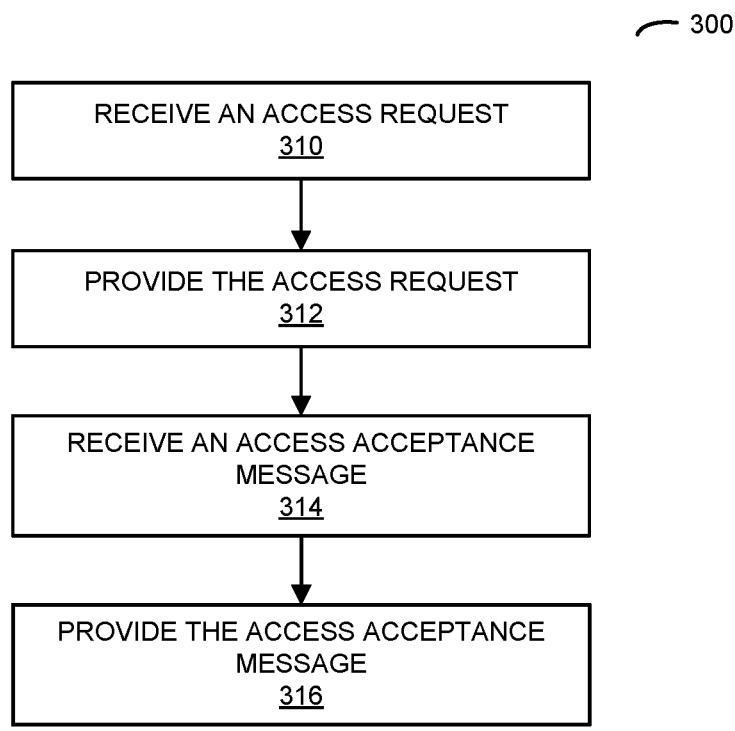
FIG. 3 is a flow diagram illustrating an example of a method for providing secure communication using an electronic device in FIG. 1 in accordance with an embodiment of the present disclosure.

FIG. 3 presents a flow diagram illustrating an example of a method 200 for providing secure communication, which may be performed by a computer, such as computer 112 in FIG. 1. During operation, the computer may receive an access request (operation 310) from a computer network device (such as an access point, a radio node or a switch). This access request may include passphrase parameters, such as: inputs to a cryptographic calculation and an output of the cryptographic calculation. For example, the passphrase parameters may include: a random number associated with an electronic device, a random number associated with the computer network device, the output of the cryptographic calculation, an identifier of the electronic device, and/or the identifier of the computer network device. In some embodiments, the access request includes a RADIUS access request.

Then, the computer may provide the access request (operation 312) to a second computer (such as a AAA server). Moreover, the computer may receive an access acceptance message (operation 314) from the second computer. This access acceptance message may information for establishing secure access of the electronic device to a network. Note that, in some embodiments, the access acceptance message includes a RADIUS access acceptance message. Next, the computer may provide the access acceptance message (operation 316) to the computer network device.

Figure 4:
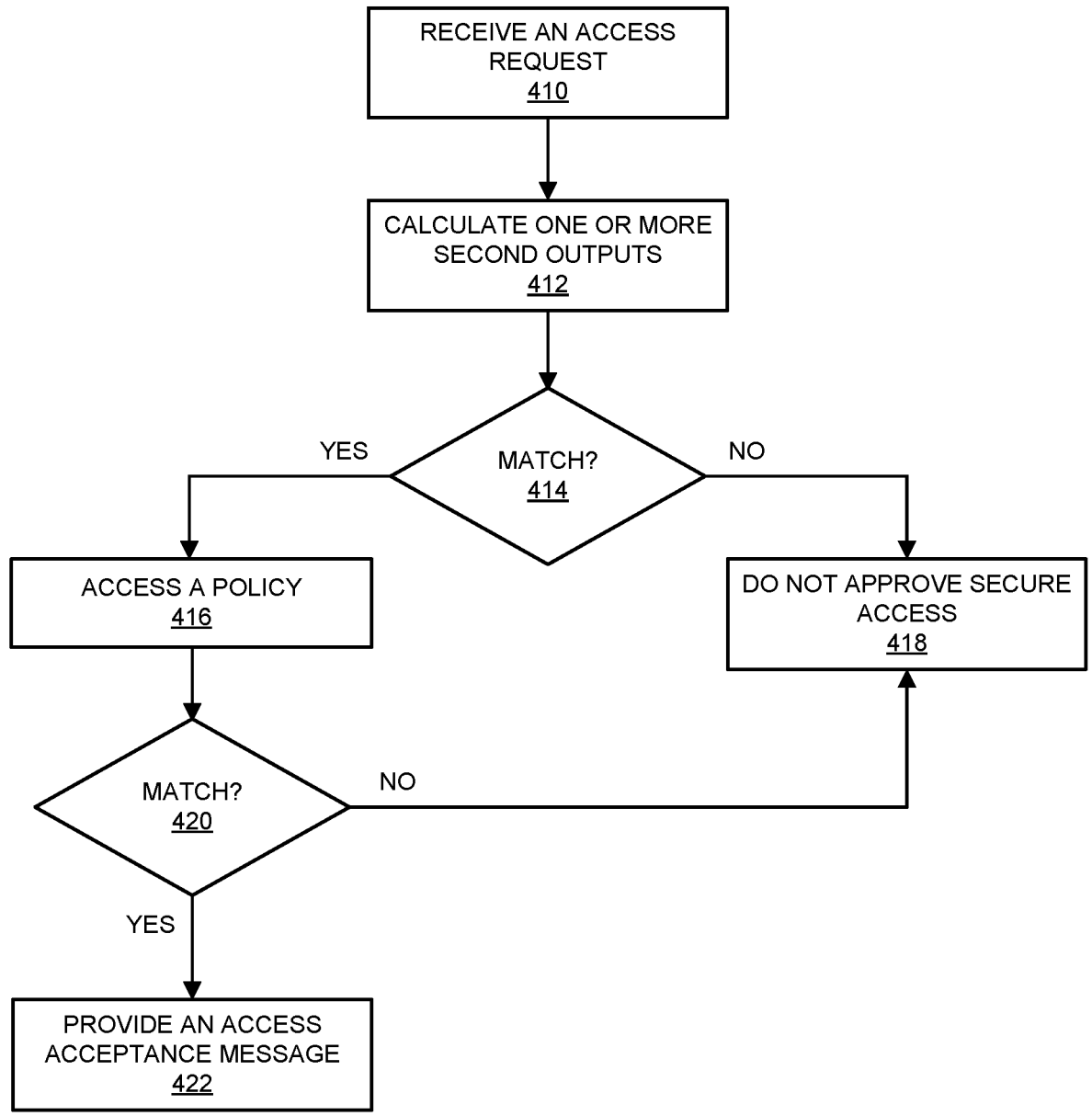
FIG. 4 is a flow diagram illustrating an example of a method for selectively providing secure access using an electronic device in FIG. 1 in accordance with an embodiment of the present disclosure.

FIG. 4 presents a flow diagram illustrating an example of a method 400 for selectively providing (e.g., approving) secure access, which may be performed by an electronic device, such as AAA server 130 in FIG. 1. During operation, the electronic device may receive an access request (operation 410) associated with a computer, where the access request includes passphrase parameters corresponding to a passphrase associated with a user, and the passphrase parameters include inputs to a cryptographic calculation and an output of the cryptographic calculation.

Moreover, the passphrase parameters may include: a random number associated with a second electronic device, a random number associated with a computer network device, an output of a cryptographic calculation, an identifier of the electronic device (such as a MAC address), and/or an identifier of the computer network device (such as a MAC address).

In response, the electronic device may calculate one or more second outputs (operation 412) of the cryptographic calculation based at least in part on the inputs and one or more stored passphrases. Note that the passphrase and the stored passphrases may include a DPSK of the user. In some embodiments, the second electronic device is included in a group of electronic devices that are associated with the user and that share the passphrase. Thus, the passphrase and the stored passphrases may include a group DPSK that is used by the group of electronic devices. However, the passphrase itself may not be included in the access request.

Moreover, when there is a match between one of the one or more second outputs and the output (operation 414), the electronic device may access a policy (operation 416) associated with the user. Otherwise, the electronic device may not approve the secure access (operation 418).

Then, when one or more criteria associated with the policy are met (operation 420), the electronic device may selectively provide an access acceptance message (operation 422) to the computer, where the access acceptance message is intended for the second electronic device and includes information for establishing the secure access of the second electronic device to a network. For example, the second electronic device may, at least in part, use the information to encrypt/de-encrypt communication and/or to establish a tunnel. Otherwise, the electronic device may not approve the secure access (operation 418).

In some embodiments, the policy may include a time interval when the passphrase is valid. In some embodiments, the policy may include a location where the passphrase is valid (such as a location of the computer network device) or the network that the user is allowed to access. For example, the interface circuit may communicate with a second computer (such as a PM server associated with an organization) to determine whether the second electronic device is associated with the location. When the second electronic device is associated with the location, the electronic device may selectively provide the access acceptance message (operation 422). Note that the location may include: a room, a building, a communication port, a facility associated with the organization (such as a hotel or an education institution), etc. Alternatively or additionally, the passphrase may identify the user known to be assigned to a location (e.g. a hotel room) and, based at least in part on the know the location, the second computer may know the identifier of the network on which to place the electronic device.

Moreover, the network may include a virtual network associated with the location (such as a virtual network for a PAN), and the information in the access acceptance message may allow the second electronic device to establish secure communication with the virtual network. This secure communication may be independent of traffic associated with other users of the network. For example, the computer network device may bridge traffic between the second electronic device and a group of electronic devices in the virtual network in the network, where the traffic in the virtual network is independent of other traffic associated with one or more different virtual networks in the network. Note that the virtual network may include: a VLAN or a VXLAN.

Furthermore, the virtual network may be specified by an identifier that is included in the access acceptance message. For example, the identifier may include a VLANID or a VNI. Alternatively or additionally, the virtual network may include: QinQ, mobility tunnels (e.g., using Home Hub and group identifiers) and/or a MAC address mapping procedure. Moreover, the identifier may include information that is capable of specifying more than 4,096 virtual networks.

Additionally, the access request may include a RADIUS access request and the access acceptance message may include a RADIUS access acceptance message. Note that the passphrase parameters may be included in a RADIUS attribute, such as a VSA. Alternatively, in some embodiments, a hypertext transfer protocol (HTTP) or HTTP-based protocol (such as HTTPv2, websockets or gRPC) may be used.

In some embodiments, the policy may allow the user to access multiple networks at different locations. In these embodiments, the inputs used to calculate the one or more second outputs of the cryptographic calculation may include a given identifier of a given network. Moreover, the one or more stored passphrases may be organized based at least in part on identifiers of different networks.

Furthermore, the second electronic device may be preconfigured with the passphrase. Note that the passphrase may be independent of the identifier associated with the second electronic device, such as the MAC address of the second electronic device. More generally, the passphrase may be independent of the second electronic device or hardware in the second electronic device.

In some embodiments of method 200 (FIG. 2), 300 (FIG. 3) and/or 400, there may be additional or fewer operations.

Furthermore, the order of the operations may be changed, and/or two or more operations may be combined into a single operation.

Figure 5:
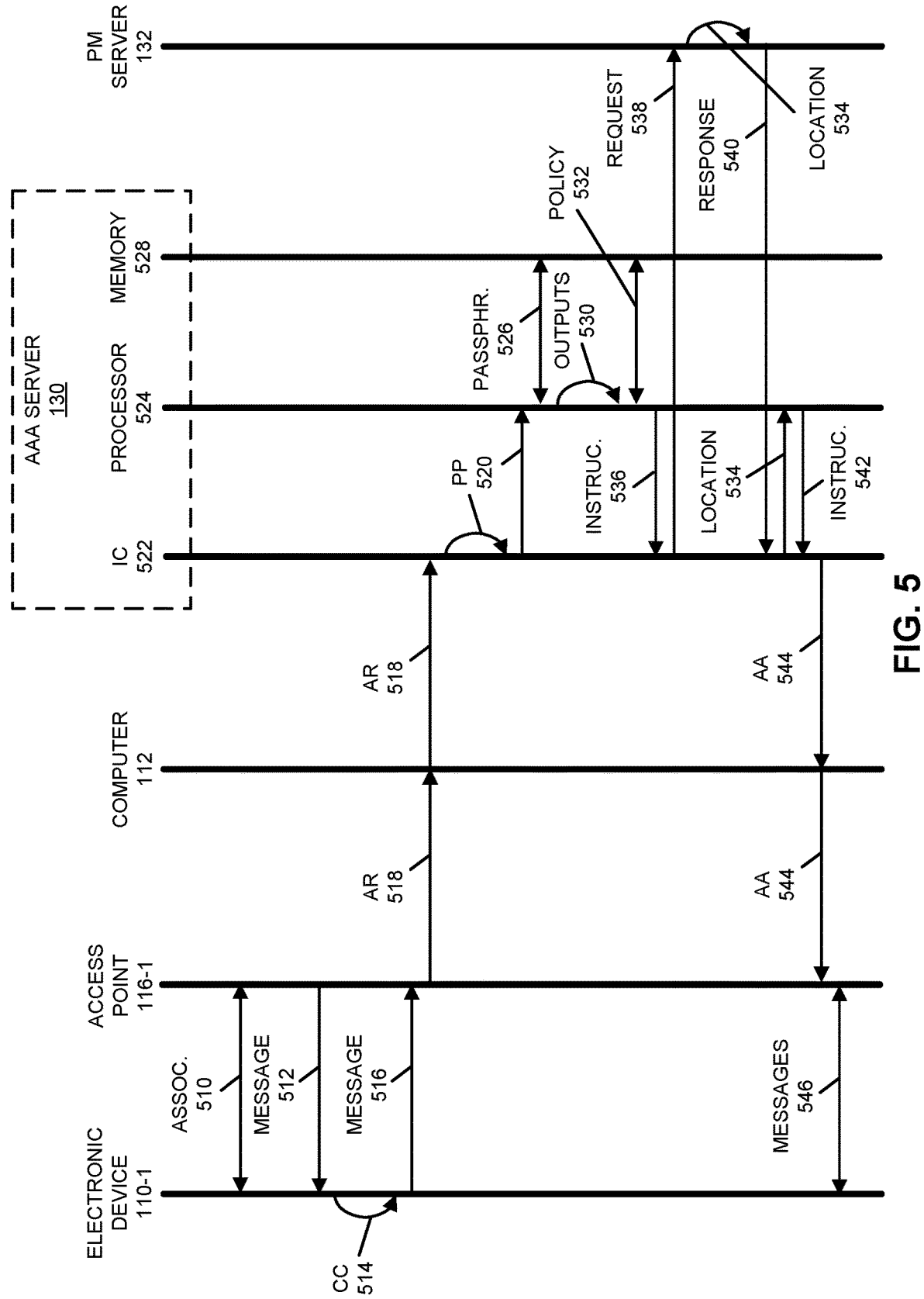
FIG. 5 is a drawing illustrating an example of communication among the electronic devices in FIG. 1 in accordance with an embodiment of the present disclosure.

Embodiments of the communication techniques are further illustrated in FIG. 5, which presents a drawing illustrating an example of communication among electronic device 110-1, access point 116-1, computer 112, AAA server 130 and PM sever 132. In FIG. 5, an interface circuit in electronic device 110-1 may discover and associate 510 with access point 116-1 via an interface circuit in access point 116-1.

Then, the interface circuit in access point 116-1 may provide a message 512 with a random number that is associated with access point 116-1 (such as an ANonce). After receiving message 512, electronic device 110-1 (such as a processor in electronic device 110-1) may perform a cryptographic calculation (CC) 514 using a passphrase (such as a DPSK), the random number from access point 116-1, a random number associated with electronic device 110-1 (such as an SNonce), an identifier of access point 116-1 (such as a MAC address), and/or an identifier of electronic device 110-1 (such as a MAC address). Moreover, the interface circuit in electronic device 110-1 may provide a message 516 with inputs to the cryptographic calculation 514 and an output of the cryptographic calculation 514. For example, message 516 may include the random number associated with electronic device 110-1 and a MIC.

After receiving message 516, the interface circuit in access point 116-1 may provide an access request (AR) 518 to computer 112. This access request may include passphrase parameters (PP) 520 corresponding to the passphrase associated with a user of electronic device 110-1. For example, passphrase parameters 520 may include: inputs to the cryptographic calculation 514 and an output of the cryptographic calculation 514. Moreover, after receiving access request 518, an interface circuit in computer 112 may provide access request 518 to AAA server 130.

Furthermore, after receiving access request 518, an interface circuit 522 in AAA server 130 may provide passphrase parameters 520 to a processor 524 in AAA server 130. Processor 524 may perform calculations of outputs 530 of the cryptographic calculation 514 using passphrase parameters 520 and stored passphrases 526 in memory 528 in AAA server 130.

When there is a match between one of the calculated outputs 530 and the output received from electronic device 110-1, processor 524 may access a policy 532 in memory 528. For example, policy 532 may indicate that secure access to a network is allowed when the user is at a location 534. In these embodiments, processor 524 may instruct 536 interface circuit 522 to confirm that electronic device 110-1 is at location 534 by providing a request 538 to PM server 132. After an interface circuit in PM server 132 receives request 538, a processor in PM server 132 may determine that electronic device 110-1 is at location 534. For example, access point 116-1 or a communication port may be associated with location 534, and/or the user may be associated with location 534 (such as a hotel room or a dorm room at a college or a university), and the processor in PM server 132 may determine that electronic device 110-1 is at location 534 by performing a lookup in memory in PM server 132. Next, the interface circuit in PM sever 132 may provide a response 540 with the confirmation.

After interface circuit 522 receives response 540 and provides information about location 534 to processor 524, processor 524 may instruct 542 interface circuit 522 to provide an access acceptance message (AAM) 544 to electronic device 110-1 with information for establishing secure access of electronic device 110-1 to a network. Then, after receiving access acceptance message 544, the interface circuit in computer 112 may provide access acceptance message 544 to access point 116-1. Moreover, after receiving access acceptance message 544, the interface circuit in access point 116-1 and the interface circuit in electronic device 110-1 may exchange additional messages 546 to complete the four-way handshake. Furthermore, based at least in part on the information in access acceptance message 544, access point 116-1 and electronic device 110-1 may establish secure access of electronic device 110-1 to the network.

While FIG. 5 illustrates communication between components using unidirectional or bidirectional communication with lines having single arrows or double arrows, in general the communication in a given operation in this figure may involve unidirectional or bidirectional communication. Moreover, while FIG. 5 illustrates operations being performed sequentially or at different times, in other embodiments at least some of these operations may, at least in part, be performed concurrently or in parallel.

Figure 6:
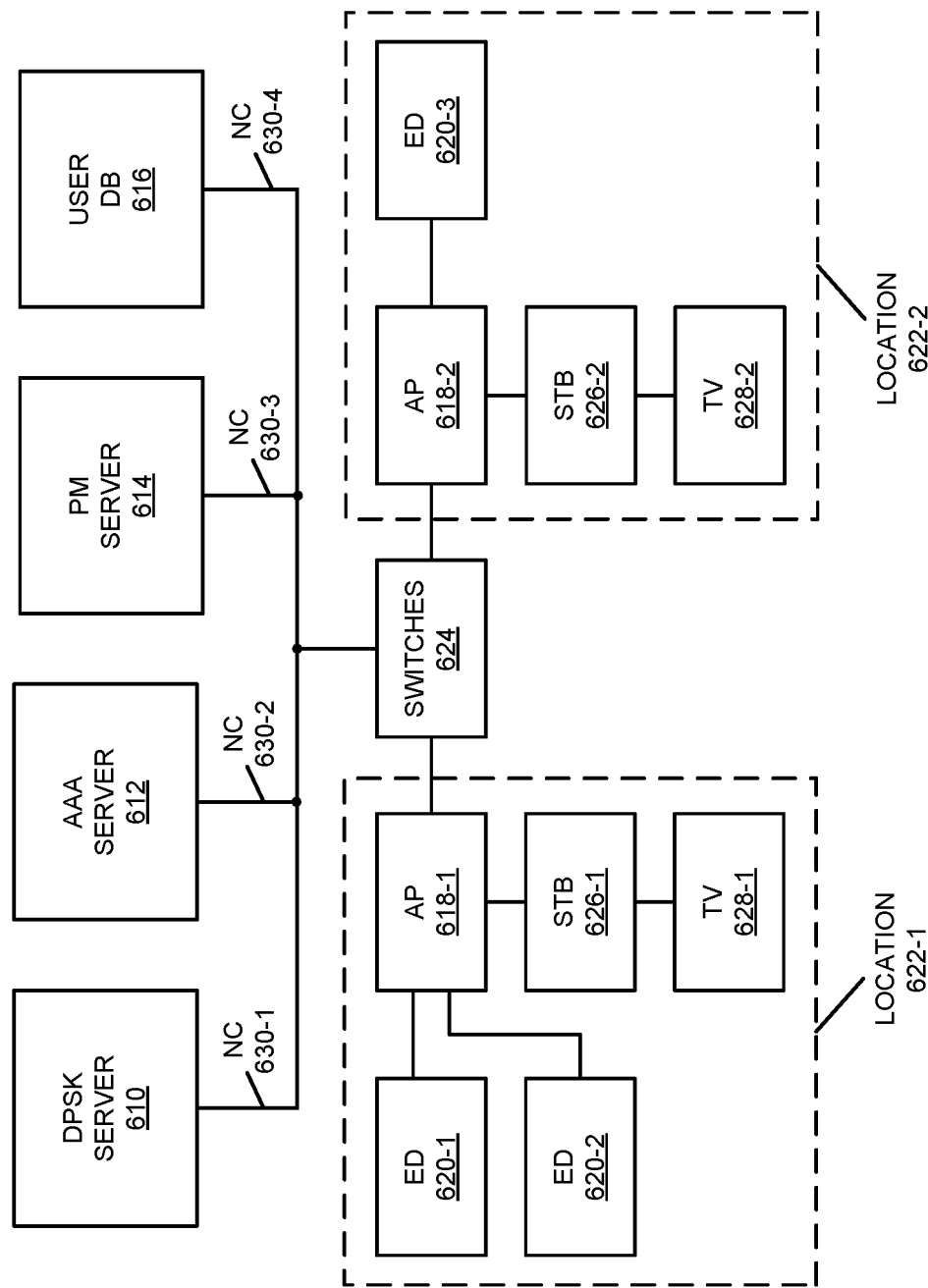
FIG. 6 is a block diagram illustrating an example of a system that implements a dynamic personal area network (PAN) providing interconnectivity between a group of electronic devices and a network while simultaneously isolating them from communicating with other electronic devices in accordance with an embodiment of the present disclosure.
Figure 7:
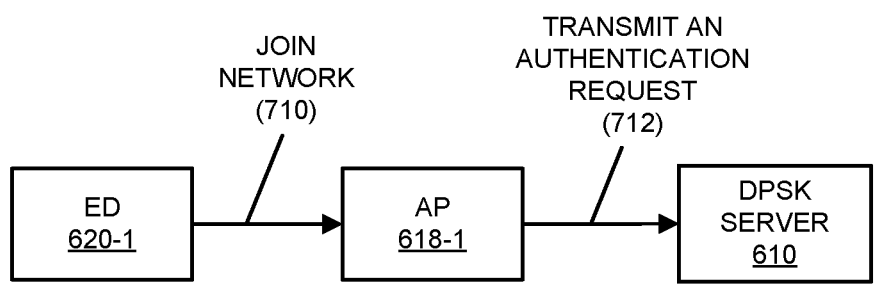
FIG. 7 is a flow diagram illustrating an example of a method for providing interconnectivity between electronic devices and a network while simultaneously isolating them from those of other electronic devices in accordance with an embodiment of the present disclosure.

FIG. 6 presents a block diagram of an example of a system for a PAN providing interconnectivity between electronic devices and to a network (such as the Internet) while simultaneously isolating them from those of other electronic devices. As shown in FIG. 6, the system may include: a DPSK server 610 (and, more generally, an authentication server); a AAA server 612; a property management (PM) server 614; and a user database (user DB) 616. Additionally, the system may include one or more access points (APs) 618 and end devices (EDs) 620 in specific locations 622 and a network of switches 624. In some embodiments, the system may include one or more set-top boxes (STB) 626, and televisions (TV) 628. When referring to a specific access point, end device, location, set-top box, or television within the following description below, only one of the particular components may be listed as an example of how all may operate. When describing how multiple instances of each component operates together, several of the components may be indicated by a number with a dash.

An explanation of exemplary internal components of access points 618, end devices 620, and DPSK server 610, AAA sever 612 and PM server 614 shown in FIG. 6 is provided below in the discussion of FIG. 21. However, in general, it is contemplated by the present disclosure that access points 618, end devices 620, user DB (or data structure) 616, and DPSK server 610, AAA sever 612 and PM server 614 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable storage medium.

Furthermore, any, all, or some of the computing devices in the access points 618, end devices 620, user DB 616, and DPSK server 610, AAA sever 612 and PM server 614 may be adapted to execute any operating system, including Linux, UNIX, Windows Server, etc., as well as virtual machines adapted to virtualize execution of a particular operating system, including customized and proprietary operating systems, as well as virtual containers including Docker and LXC (Linux containers). Access points 618, end devices 620, user DB 616, and DPSK server 610, AAA sever 612 and PM server 614 may be further equipped with components to facilitate communication with other computing devices over one or more network connections (NCs) 630. The network connections 630 may include connections to local and wide area networks, wireless and wired networks, public and private networks, and/or any other communication network enabling communication in the system.

In FIG. 6, end devices 620 may include a personal computer, laptop, smartphone, tablet computer, personal digital assistant, set top box, in-vehicle computing systems, an Internet-of-Things (IoT) device, and/or other similar computing device. Moreover, end devices 620 may include one or more memories or memory locations for storing the software components. The one or more memories in end devices 620 may include, but are not limited to, random access memory (RAM), dynamic random access memory (DRAM), read only memory (ROM), logic blocks of a field programmable gate array (FPGA), erasable programmable read only memory (EPROM), and electrically erasable programmable ROM (EEPROM).

Furthermore, end devices 620 may include: a user interface (such as a keyboard, a mouse, a touch-sensitive display, etc.); and a network connection between user and access points 618, set-top boxes 626, and/or televisions 628, or the like to allow a user to view and interact with the applications, tools, services, and other software of end devices 620. The present disclosure contemplates that more than one of end devices 620 may be a part of the system as is shown in FIG. 6.

Note that DPSK server 610 may be a network server that provides authentication services. DPSK server 610 may authenticate a given one of end devices 620 using DPSK authentication. Moreover, DPSK server 610 may include a data structure or a database in which user identifiers and their DPSK passphrases are stored. DPSK server 610 may communicate with access points 618 and AAA server 612 using network connection 630-1. Furthermore, DPSK server 610 may use technology to provide verification of the information provided from end device 620-1.

Additionally, AAA server 612 may be a network server that communicates with DPSK server 610, PM server 614, and user DB 616 using a network connection 630-2. AAA server 612 may authorize end devices 620 and select policy for the network access server (NAS), which in this case is an access point, to apply. In some embodiments, AAA server 612 has access to user accounts, PM server 614, and/or user DB 616. Note that PM server 614 may include a database or a data structure that includes location information (e.g., a room number in a hotel) to which each guest has been assigned.

Moreover, user DB 616 may be a database of loyalty customers. These loyalty customers may be from a loyalty program of an organization, group, or the like. User DB 616 may be capable of persistently storing DPSK passphrases, as well as information with respect to end devices 620 connected to loyalty customers and their family members.

Furthermore, access point 618 may include an access point that implements a WLAN protocol interface and Ethernet interfaces. Access points 618 may be understood to mean an access point operating along or in conjunction with a WLAN controller (such as computer 112 in FIG. 1). Additionally, access points 618 may be configured to broadcast a specific service set identifier (SSID). The present disclosure contemplates that more than one of access points 618 can be a part of the system as is shown in FIG. 6.

In order to have a PAN that provides interconnectivity between guest devices and to a network (such as the Internet) while simultaneously isolating them from those of other guests, the end devices that should be grouped together to form the PAN needs to be determined or identified. Additionally, enforcement needs to occur of forwarding policies on access points 618 and the Ethernet infrastructure, which may include switches and routers, to ensure that only members of a common PAN can forward traffic among themselves. The PAN may be maintained wherever the end user carries their end devices 620 throughout an area within radio or wireless range of access points 618.

Notably, each end user or guest in a given group may be provided with a DPSK (e.g., a group-DPSK passphrase) or just passphrase. One or more of the guest's end devices 620 in a given group may be provisioned with the exact same passphrase (which is sometimes referred to as a 'common passphrase'). All of end devices 620 that authenticate to a WLAN using the same passphrase may receive the same services from the network. For an example, all end devices 620 may be placed on the same VLAN, given the same privileges to access certain servers on a local area network (LAN) and denied privileges to access other servers and/or be privileged to access the network (such as the Internet) at a certain maximum speed (in bits/second). Instead of placing all the passphrases into a single pool, the DPSK authentication may be partitioned into a set of smaller computational workloads (or groups) with a database or data structure binding between a WLAN and a pool identifier, which may provide efficient cloud-scale computing in which computation nodes can be easily removed/added as the number of pools and/or WLANs being served by the DPSK authentication service decreases/increases. Note that each passphrase may be in a separate DPSK pool and/or each DPSK pool may be used to authenticate on one or more WLANs.

A single passphrase may be given to an end user, a guest, or loyal customer, and that individual can provision the passphrase into all of their end devices that they bring, or plan to bring, to a specific location. With this system, it may not be necessary for the infrastructure to know the MAC address of end device 620-1 provisioned with a passphrase. This may result in several issues. First, there is no requirement for the end user to provide the MAC address of their end devices 620 to the specific location, organization, etc. This is a benefit for the end user, because many end users are not familiar with the details of networking, and thus may not know what a MAC address is or where on a given end device it can be found.

Additionally, the lack of a MAC address may make authentication of a passphrase more computationally difficult, because the infrastructure, such as AAA server 612, may not be able to simply look up the passphrase in the database using the MAC address as a key. The infrastructure in the system in FIG. 6 may employ cryptographic techniques to find a matching passphrase from a pool of passphrases, or DPSK pools. Each of the DPSK pools may be identified by a pool identifier and may have a separate policy. A person skilled in the art can appreciate that another authentication technique can be substituted for DPSK. For example, IEEE 802.1X authentication is also another technique for authenticating. Both of these techniques are secure and difficult to spoof (e.g., masquerade as another by falsifying data to gain an illegitimate advantage).

Traditionally, on a WPA/WPA2-personal network, all electronic devices are provided with the same passphrase and thus cannot be uniquely authenticated. As described below, each of end devices 620 having a unique passphrase may be uniquely authenticated. Moreover, if end devices 620 are provided a group DPSK passphrase, they can be authenticated as belonging to that unique group. Because of this, the network can apply a policy (such as VLAN assignment) suitable for each of end devices 620 or the group of electronic or end devices as the case may be. The policy may be a set of conditions, constraints, and settings (or rules) that allow one to designate who is authorized to connect to the network and the circumstances under which they can connect.

Note that specifications under IEEE 802.11 standards describe in detail the cryptographic computations for a PSK, which may be a part of the DPSK passphrase.

FIGS. 7-12 present a flow diagram illustrating an example of a method 700 for initiating implementing cloud-scale group authentication using one or more electronic devices in the system in FIG. 6 in accordance with an embodiment of the present disclosure. In operation 710 in FIG. 7, end device 620-1 may be turned on (or end device 620-1 may already be operating) and is brought within radio range of location 622-1. End device 620-1 may discover the WLAN being broadcasted by access point 618-1 and recognizes it has been configured with a passphrase for that SSID or WLAN, and joins the network through access point 618-1. Upon joining the network, end device 620-1 may begin passphrase authentication.

Then, in operation 712, as part of an authentication exchange, access point 618-1, which may be configured to provide DPSK authentication for this WLAN, may send an authentication request to DPSK server 610. In the following description, a RADIUS protocol is used as an illustrative example. However, it should be understood that other protocols can be used for the authentication request as well, such as a representational state transfer (REST) protocol, DIAMETER or the like.

Figure 8:
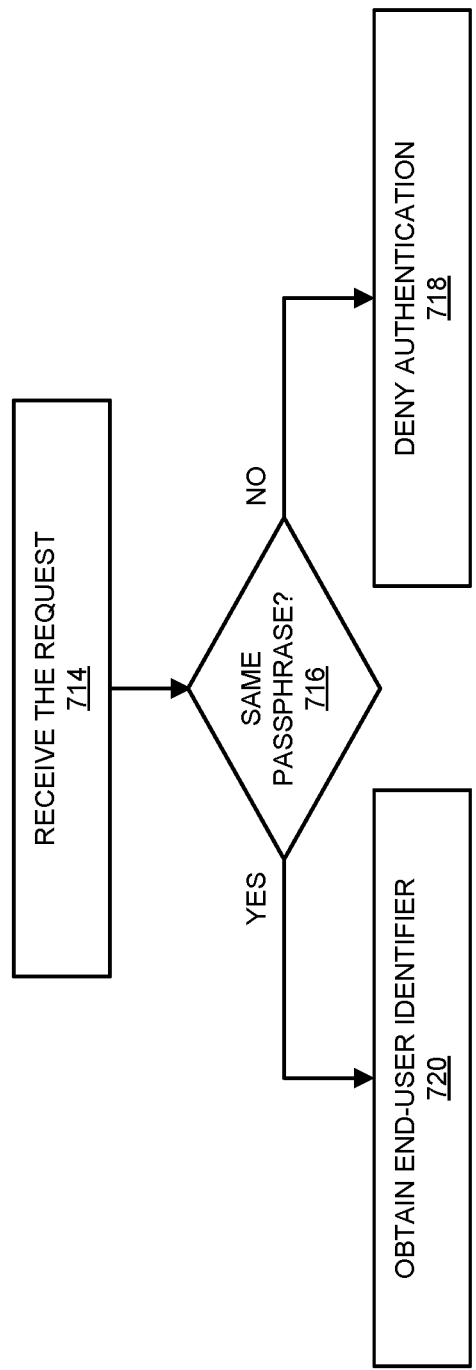
FIG. 8 is a flow diagram illustrating an example of a method for providing interconnectivity between electronic devices and a network while simultaneously isolating them from those of other electronic devices in accordance with an embodiment of the present disclosure.

DPSK server 610 may receive the request from end device 620-1 through access point 618-1 in operation 714 in FIG. 8. Moreover, in operation 716, DPSK server 610 may checks if end device 620-1 used the same passphrase as was configured in DPSK server 610. If it is determined that the passphrases do not match, the authentication may be denied in operation 718. Alternatively, if DPSK server 610 successfully authenticates end device 620-1, then DPSK server 610 may obtain an EUI associated with that particular passphrase in operation 720. Note that the authentication may refer to cryptographic information that is supplied by end device 620-1 and derived from the passphrase.

Figure 9:
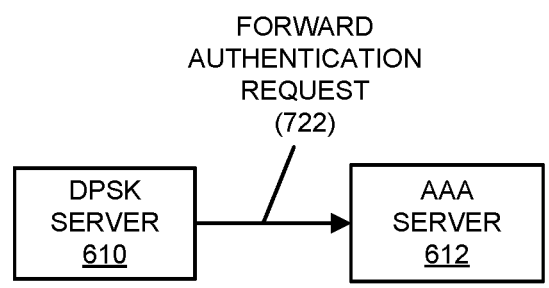
FIG. 9 is a flow diagram illustrating an example of a method for providing interconnectivity between electronic devices and a network while simultaneously isolating them from those of other electronic devices in accordance with an embodiment of the present disclosure.

In operation 722 in FIG. 9, DPSK server 610 may forward the authentication request and the EUI to AAA server 612 with a positive determination or approval that end device 620-1 used the same passphrase as that configured in the DPSK server.

Figure 10:
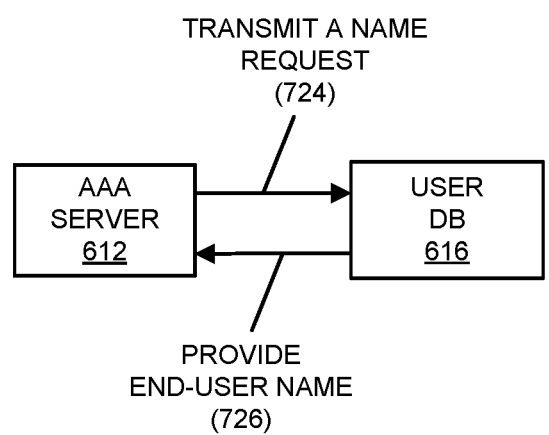
FIG. 10 is a flow diagram illustrating an example of a method for providing interconnectivity between electronic devices and a network while simultaneously isolating them from those of other electronic devices in accordance with an embodiment of the present disclosure.

In operation 724 in FIG. 10, AAA server 612 may transmit a name request, with the EUI, for an end-user name to user DB 616. The name request may be anything common to user DB 616 and PM server 614. Note that user DB 616 may respond with the end-user name back to AAA server 612 in operation 726.

Figure 11:
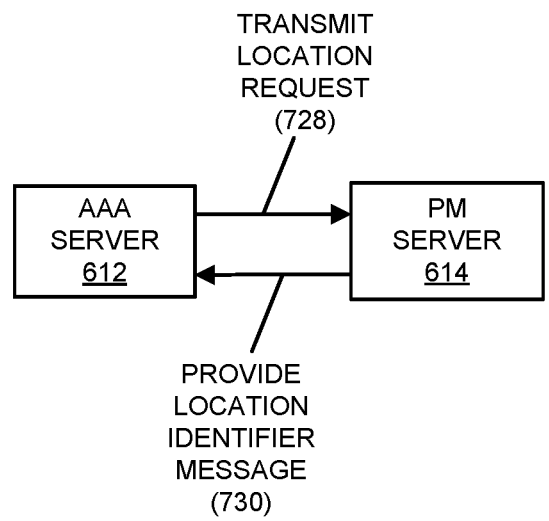
FIG. 11 is a flow diagram illustrating an example of a method for providing interconnectivity between electronic devices and a network while simultaneously isolating them from those of other electronic devices in accordance with an embodiment of the present disclosure.

In operation 728 in FIG. 11, AAA server 612 may transmit a location request for a location assigned to the end-user name (e.g., a room number in a hotel) to PM server 614. In operation 730, AAA server 612 may receive a location identifier message from PM server 614 in response.

Figure 12:
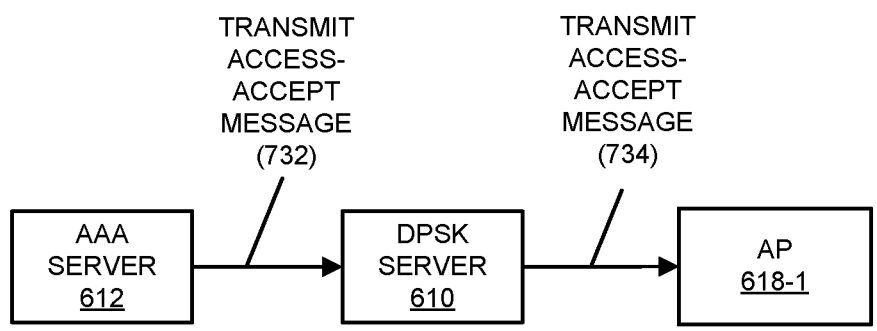
FIG. 12 is a flow diagram illustrating an example of a method for providing interconnectivity between electronic devices and a network while simultaneously isolating them from those of other electronic devices in accordance with an embodiment of the present disclosure.

Prior to operation 732 in FIG. 12, AAA server 612 may look up in an internal database or data structure, a policy assigned to the location identifier (received from PM server 614), as well as other policies to be applied to the network connection of end device 620-1. In operation 732, AAA server 612 may transmit an access-accept message, including the policy, to DPSK server 610. Then, DPSK server 610 may transmit the access-accept message to access point 618-1 in operation 734.

The location identifier and policy in operation 730 and 732 may take on different forms depending on the embodiment. In certain embodiments, the policy may be a VLAN identifier. In these embodiments, PM server 614 may maintain a mapping between the location and the VLAN identifier assigned to that location, or another networking device (such as AAA server 612 or a WLAN controller) may maintain the mapping between the location and the VLAN identifier assigned to that location. End device 620-1 may be assigned to a VLAN after successfully authenticating to AAA server 612. The VLAN identifier may be assigned to end device 620-1 by AAA server 612 and communicated to the NAS (such as access point 618-1) in an authentication response. Thereafter, frames and/or digital data transmission units transmitted to or received from end device 620-1 may be forwarded on the assigned VLAN.

In some embodiments of method 700 in FIGS. 7-12, there may be additional or fewer operations. Furthermore, the order of the operations may be changed, and/or two or more operations may be combined into a single operation.

In an environment where method 700 may be deployed, such as hospitality like in hotel chains, there may need to be as many VLANs configured in the network in a hotel as there are guest rooms. Thus, each guest room may have its own VLAN, facilitating the PAN for the guest assigned to that room. When a guest checks into the hotel, a VLAN/VLAN identifier may be assigned to them for the duration of their stay. In addition, in this particular environment, the VLANs may be trunked between Ethernet switches, thereby extending the VLANs throughout the network. In this scenario, the PAN may 'roam' with end devices 620 (e.g., as end devices 620 roam from one access point to another access point in access points 618, the PAN may stay intact).

In other embodiments, a guest may bring their own set-top box that acts as a client device and is provided with the guest's DPSK passphrase. Upon joining the WLAN, the client device may also join the guest's PAN. Alternative embodiments to this structure are described below.

In certain embodiments, the identification may include two parameters, a home-hub identifier and a group identifier. The home-hub identifier may identify access point 618-1 to which set-top box 626-1 is connected. Note that the group identifier may be the PAN identifier to which at least a subset of end devices 620 are assigned.

An example of an embodiment with the identification including a home-hub identifier and a group identifier is shown in FIG. 6. End devices 620-1 and 620-2, both in location 622-1 are associated with access point 618-1. As a result of the DPSK authentication, access point 618-1 may be informed by AAA server 612 that access point 618-1 is the home hub and that both end devices 620-1 and 620-2 are members of group identifier 1. Access point 618-1 may locally forward frames between 620-1 and 620-2. End device 620-3, belonging to an end user assigned to location 622-2, may connect to or associate with access point 618-2. Through DPSK authentication, access point 618-2 may be informed that end device 620-3 is in group identifier 1 and that the home hub is access point 618-1. Because access point 618-2 has information that it is not the home hub for end device 620-3, access point 618-2 may forward frames from end device 620-3 toward its home hub. For example, access point 618-2 may use a mobility tunnel to forward frames to access point 618-1.

In order to establish the mobility tunnel, the home-hub identifier may be used to determined how to reach the destination (access point 618-1 in the preceding example). When the home hub terminates a mobility tunnel, it may cache the Internet Protocol (IP) address of the tunnel originator. Thus, when a PAN member has data to send to another member of the PAN that is connected via a mobility tunnel, the home-hub access point may know where to send the frames.

In some embodiments, one or more tunnel protocols can be used for the mobility tunnel, such as, but not limited to: Ethernet over IP (EoIP), GRE, a VXLAN, or another mobility tunnel technique or protocol.

When a tunnel-terminating home hub receives a frame encapsulated in a mobility tunnel, it may verify the authenticity of the tunnel originator using a tunnel protocol that provides mutual authentication. Another way to verify the authenticity is to verify that the source IP address is bound to an authorized (by the network administrator) tunnel originator. This verification may occur by access point 618-1 querying the WLAN controller to see if the source IP address belongs to access point 618-2, or to verify that access point 618-2 has at least one of associated end devices 620 belonging to the guest assigned to that home hub.

In certain embodiments, the identification may include two parameters, the group identifier and a device identifier. An example of an embodiment with this identification would be when end devices 620-1 and 620-2 associate with access point 618-1. AAA server 612 may inform access point 618-1 that both of end devices 620-1 and 620-2 are members of group identifier 1 after the DPSK authentication. During association, access point 618-1 may receive the MAC addresses for end devices 620-1 and 620-2. Before forwarding a frame from a given end device, the MAC address of this end device (the source MAC address in the Ethernet frame) may be replaced with a MAC address that includes the group identifier and the device identifier (an example shown in Table 1). Having mapped the MAC address, the frame may be forwarded into the network. Moreover, once the MAC address is mapped, the frame may be forwarded into a wired network, where it may be bridged/routed as usual.

TABLE 1

| MAC Organizationally Unique Identifier (3 Bytes) | Group Identifier (2 Bytes) | Device Identifier (1 Byte) |
| --- | --- | --- |

Note that the MAC organizationally unique identifier may have a range of $2^{24}$ MAC addresses. In order to o assure that there is no conflict with any other MAC addresses present on a network, a new MAC organizationally unique identifier may be obtained, e.g., from the IEEE, and used for MAC-mapping purposes. For example, as discussed above, two bytes may be reserved for the group identifier and a byte may be reserved for the device identifier. However, other mapped MAC address formats are also possible. Another example of how this mapping can be illustrated is, if the MAC organizationally unique identifier was f0:b0:52, then if end device 620-1 was assigned to location 622-1 and a device identifier of 9, the mapped MAC address would be f0:b0:52:00:01:09.

Moreover, if end device 620-1 has a frame to send to end device 620-2, access point 618-1 may receive the frame, map the source MAC address of the frame as described previously and, by inspecting the destination MAC address in the frame, determine that the frame is destined end device 620-2. Because access point 618-1 knows, from the DPSK authentication, that end device 620-1 is a member of group identifier 1, and because the mapped source MAC address has a matching group identifier, access point 618-1 may forward the frame to end device 620-1. However, if the group identifier in the mapped MAC address did not match the group identifier of the destination device, access point 618-1 would filter, or drop, the frame.

In order to further illustrate operation of a guest's PAN, end device 620-3, which belongs to the guest assigned to location 622-2, may connect to or associate with access point 618-2. As a result of the DPSK authentication, access point 618-2 may be informed that end device 620-3 is in group identifier 1, which is the group assigned to the guest staying in location 622-1. End device 620-3 may have a frame to send to end device 620-1. Access point 618-2 may receive the frame, map the source MAC address of the frame and, by inspection of the destination MAC address, determine the frame is destined to an end device other than the ones which are wirelessly associated with access point 618-2. Therefore, access point 618-2 may forward the frame out its Ethernet interface, relying on the wired network in the hotel, to get the frame to the correct access point. When access point 618-1 receives the frame, by inspecting the destination MAC address, access point 618-1 may realize the frame is destined for end device 620-1. Because access point 618-1 knows end device 620-1 is a member of group identifier 1, and that group identifier 1 is the group identifier in the source (mapped) MAC address, access point 618-1 may forward the frame to end device 620-1. If the group identifier drawn from the source (mapped) MAC address of the frame was other than group identifier 1, access pint 618-1 would have filtered the frame.

Moreover, in order to understand the frame forwarding, it may be important to understand how an address resolution protocol (ARP) works when used with the mapped MAC address in alternative embodiments. Consider the preceding situation where end device 620-3 has a frame to send to end device 620-1. End device 620-3 may know the IP address of end device 620-1, but does not know its MAC address at the outset of the process. Therefore, end device 620-3 may send an ARP request, asking the network to supply the MAC address corresponding to the IP address for end device 620-1. When the ARP request arrives at end device 620-1, end device 620-1 sends an ARP reply with its MAC address.

Because the network forwarding is based at least in part on the mapped MAC address of end device 620-1, access point 618-1 may replace the MAC address of end device 620-1 inside the ARP response payload with its mapped MAC address. Therefore, end device 620-3 now has the mapped MAC address of end device 620-1. Once the ARP exchange is completed, end device 620-3 may send its message in a frame having its own MAC address as the source MAC address and the mapped MAC address for end device 620-1 as the destination MAC address. End device 620-3 sending the frame and the network know the destination device by its mapped MAC address, not its native MAC address. Therefore, when the frame arrives at access point 618-1, access point 618-1 may know end device 620-1 is a member of group identifier 1, and may replace the destination MAC address in the frame with the native MAC address of end device 620-1. Otherwise, end device 620-1 would filter the frame.

In the preceding embodiment, end device 620-1 sent the ARP reply, however, the ARP reply can be sent by access point 618-1 as a proxy-ARP service. The mapped MAC address option works with IPv6 neighbor solicitation in a similar manner.

Moreover, in the preceding embodiments with the mapped MAC address, the device identifier may be determined as follows. Because the MAC address of end devices 620 on a network must be unique, the entity supplying the device identifier must ensure a unique mapping from a native MAC address of a given end device to its mapped MAC address. Moreover, because the group identifier will be unique for each end user or guest, a unique device-identifier value may be supplied to each of the end devices of the users, ensuring that no device identifier is duplicated. This can be handled in several ways.

AAA server 612 may keep a list of each of end devices 620 of a user (which may be stored persistently in user DB 616 or AAA server 612). This list may include a unique device identifier for each and every MAC address. As long as a single end user does not have, e.g., more than 256 end devices, this can work well. If more than 256 end devices occur, AAA server 612 may remove from the list the end device having the oldest date/time when it last authenticated to the network (and, thus, is likely no long being used by the user).

Moreover, AAA server 612 may keep a list of the active sessions for each user. There will be an active session corresponding to each and every end device the user has joined to the network. Because the standard practice is to limit the maximum number of end devices for a particular user, AAA server 612 may ensure that the number of sessions is always less than the number of end devices permitted by the device identifier (in this example, 256 devices). If an end device disassociates from the network, its session is also deleted and the device identifier that was previously used can now be reused for a different end device.

In some embodiments, note that a WLAN controller may perform the functions described in the previous discussion instead of AAA server 612.

Furthermore, in some embodiments, the identification may include the VLAN identifier. However, when access point 618-1 receives the VLAN identifier, it may be interpreted by access point 618-1 as a customer VLAN (C-VLAN) identifier. Additionally, a single VLAN may be configured on the Ethernet switches 624 and trunked throughout the network. In some embodiments, access points 618 in the network may be configured to use IEEE 802.1ad (which is sometimes referred to as QinQ). Notably, an outer VLAN or a service VLAN (S-VLAN) may be configured to have the same VLAN identifier as the Ethernet-switching network. AAA server 612 may dynamically assign the inner VLAN or C-VLAN. Each PAN may have an assigned unique C-VLAN identifier. The sequence of events may be the same as with the VLAN identifier. Access point 618-1 may forward frames from end device 620-1 and may take one of two actions based at least in part on the destination MAC address of a given frame. If the MAC address is the MAC address of the PAN member, then access point 618-1 may add a C-VLAN tag and a S-VLAN tag to the frame, and may forward the frame upstream. If the destination MAC address is the MAC address of a default router, it may only add the S-VLAN tag. Upon receipt of the frame, the switching/routing infrastructure may forward the frame toward its destination.

In certain embodiments, DPSK server 610, AAA server 612, PM server 614, and/or user DB 616 may be part of a single server. However, there are at least several reasons that the servers may remain separated. Keeping DPSK server 610 as a separate network entity may help support service scaling. Moreover, the larger user DB 616 is, the larger the DPSK pool is as well. Furthermore, computation loads increase for finding matching passphrases for an authenticating device when there are many DPSKs to check. With DPSK server 610 implemented in the cloud, the number of servers handling the computational workload may be dynamically increased or decreased as needed. When DPSK server 610 is implemented in the same networking device as AAA server 612, the servers cannot be individually scaled according to their own computational workloads. In other embodiments, however, combining DPSK authentication and authorization into a single networking device may be advantageous and, if implemented, may be referred to as a AAA server.

An example of an environment where method 700 may be processed, is hospitality such as hotel chains. Some hotel chains have hundreds of venues providing hospitality to thousands of guests concurrently. Cloud-scale systems may provide authentication performance for their guests whenever they choose to join the network in a hotel. Additionally, guests that include entire families may share the same PAN, but the network may, e.g., prevent the children from accessing adult content by applying a different policy to the children than to the parents. A guest may bring their end devices 620 to a hotel. If they are part of a loyalty program, they may have their information included in user DB 616. Once the guest is assigned a room (location 622-1, as an example), their end devices 620 may be connected to the Internet and join the network connecting through an access point (such as access point 618-1) assigned to that particular room. One of set-top boxes 626 and/or one of televisions 628 may also be part of the assigned space for their PAN. The guest may then project from their end device to the television, e.g., without having to be concerned that it will be shown on another television in another room. When a set-top box is used, set-top boxes 626 at locations 622 may be used or a guest can provide one or more set-top boxes 626 along with the end devices 620. Note that set-top boxes 626 may be connected to respective televisions 628.

Note that by having a system configure multiple DPSK pools with different policies, new services may become practical. For example, as discussed previously, when the guests (such as a family) check into a hotel, the parents may be given a DPSK passphrase that provides a different policy than the DPSK passphrase provided to the children. The entire family may share a PAN, because the system keeps track that both passphrases belong to members of a single family, but the PAN may prevent the children from accessing adult content. The passphrases used by the parents and children may be generated ahead of time and persistently stored in user DB 616.

In some embodiments, one of set-top boxes 626 (such as set-top box 626-1) may be connected to an Ethernet port on one of access points 618 (such as access point 618-1) and also on one of televisions 628 (such as television 628-1) at a location 622-1. In another location 622-2, set-top box 626-2 may be connected to an Ethernet port on access point 618-2 and also to television 628-2, continuing at each additional location within the network. In other words, the disclosed communication techniques may be used with wired and/or wireless electronic devices.

In some embodiments, the system in FIG. 6 may have fewer or additional electronic devices or components, two or more electronic devices or components may be combined into a single electronic device or component, a single electronic device or component may be divided into two or more electronic devices or components, and/or a position or location of a given electronic device or component may be changed.

In some embodiments, the communication techniques may be used to provide secure communication, e.g., in the hospitality and/or other market segments. In the communication techniques, a PAN is dynamically created to provide interconnectivity between the guest's electronic devices and a network (such as the Internet) while simultaneously isolating them from the communication associated with other guests. Moreover, in the communication techniques which electronic devices should be grouped together to form the PAN is identified. Then, forwarding policies are enforced on access points and the Ethernet infrastructure (such as switches and routers) to ensure that only members of a common PAN can forward traffic among themselves.

In order to identify which electronic devices should form a single PAN, each hotel guest may be provided with a passphrase (such as a PSK, a DPSK or another type of digital certificate). For example, the passphrase may include a group DPSK passphrase or a group passphrase. Note that each device having a DPSK passphrase (or a group of electronic devices sharing a group DPSK passphrase) may be uniquely authenticated. Because they can be authenticated, the network can apply a policy (e.g., a VLAN assignment) suitable for that electronic device (or group of electronic devices, as the case may be). This is different than a WPA/WPA2 personal network in which all the electronic devices on this network are provided with the same passphrase and thus cannot be uniquely authenticated.

With group-passphrases, one or more electronic devices (the group) may be provisioned with the exact same passphrase. All the electronic devices that authenticate to a WLAN using the same group passphrase may receive the same services from the network. For example, all the electronic devices may be placed on the same VLAN, given the same privileges to access certain servers on a LAN, denied privileges to access other servers and/or be privileged to access the Internet at a certain maximum speed (in bits/second). Group passphrases may be convenient and easy to use, because a single passphrase may be given or provided to one hotel guest (e.g., a loyal customer) and, in turn, that individual can provision the passphrase into all of the electronic devices that they bring (or plan to bring) with them to the hotel. Note that the infrastructure usually does not know the MAC address of an electronic device that has been provisioned with a group passphrase. This means that the guest does not need to tell the hotel the MAC addresses of their electronic devices. In fact, many guests will not even know what a MAC address is or where to look on the device to find it. Secondly, a lack of a MAC address typically makes authentication of group passphrases more computationally difficult, because the infrastructure (e.g., a AAA server) cannot simply look up the passphrase in a database or data structure using the MAC address as a database key. Instead, the infrastructure may employ a cryptographic technique to find a matching passphrase from a set (which is sometimes referred to as a 'pool') of passphrases. However, a variety of authentication techniques may be used.

For example, while DPSK authentication is one way that individual electronic devices can be identified, subsequently authorized and placed on a common PAN, another authentication technique is IEEE 802.1X authentication (using a variety of different extensible authentication protocol techniques). Both of these authentication techniques are secure and, if implemented/deployed correctly, are difficult to spoof. Another authentication technique is MAC-address authentication. In this authentication technique, an electronic device may be considered authenticated when it presents a known MAC address to the network. However, this authentication technique suffers from being insecure, because MAC addresses are easy to spoof. Therefore, in many use cases, MAC-address authentication is not used, even though it can be used to apply a common policy to a group of electronic devices, such as placing these electronic devices on a common PAN.

Another aspect of the communication techniques is cloud-scale operation. This disclosure recognizes that DPSK passphrases are actually authentication credentials. In existing approaches, they have been used as so-called '$2^{nd}$ class' credentials, which are useful for authentication on a single WLAN (or SSID). However, there is no reason to so limit them. If properly implemented by network-infrastructure components, a DPSK passphrase may be used to authenticate an electronic device on any number of SSIDs.

In the communication techniques, by forming DPSK passphrases sharing a common policy into DPSK pools, a pool (identified by a pool identifier) may simplify the application of user policy in WLANs. This may make it easier for DPSK passphrases to serve as authentication credentials for multiple WLANs.

Moreover, by creating a database or a data structure binding between a WLAN and a pool identifier, the infrastructure can partition the DPSK authentication problem (such as by determining the passphrase used by a particular end device from a set of provisioned passphrases) into a set of smaller computational workloads. This may lead to efficient cloud-scale computing in which computation nodes can be easily added/removed as the number of pools and/or WLANs being served by a DPSK authentication service increases/decreases. Generally, this will be much more efficient than putting all the passphrases into a single large pool.

Furthermore, by having a system in which it is simple to configure multiple DPSK pools with different policies, new services may become practical to deploy. For example, when a guest and their family check into a hotel, the parents could be given a DPSK passphrase that provides a different policy than the DPSK passphrase provided to their children. As such, the entire family may share the same PAN (because the infrastructure keeps track of the fact that both passphrases belong to members of a single family), but the network prevents the children from accessing adult content (e.g., the network may apply a different policy to the children than to the parents). Alternatively, the parents' and children's' passphrases may be computed ahead of time and persistently stored in a loyalty-customer or user database.

Additionally, some large hotel chains have hundreds of venues providing hospitality to thousands of guests concurrently, and there are many different hotel chains in the world. Therefore, cloud-scale systems can provide excellent (sub-second) authentication performance for all their guests whenever they choose to join the network in a hotel.

For large hotel chains, the size of the loyalty-customer database (i.e., a number of loyalty customers) may be quite large (millions of users). In order to reduce the computational workload of DSPK authentication, DPSK pools may be sub-divided. For example, there may be a DPSK pool that includes the passphrases of the guests staying only at a particular hotel location (e.g., just the hotel located in San Francisco). Then, the number of passphrases to search in order to finding a matching passphrase would be greatly reduced. Such a DPSK pool may be updated dynamically when a guest checks into or out of the hotel, or when the guest makes their reservation.

In order to further reduce the computational workload for DPSK authentication, MAC address-to-DPSK passphrase bindings may be saved in the loyalty-customer database. For example, when a guest electronic device joins the WLAN in a hotel, the network may perform DPSK authentication on this electronic device. Upon successful authentication, the DPSK server may have learned the MAC address and passphrase of the electronic device. On a subsequent device authentication, whether on the same or different stay, and whether at the same or different hotel, the DPSK server may attempt to find a matching MAC address saved in the loyalty-customer database along with the previously matched passphrase. Most of the time, the electronic device may continue to use the same passphrase. Thus, the computational workload for a DPSK authentication request is reduced from performing cryptographic calculations on a large table of passphrases (in order to find a matching passphrase) to a database lookup followed by a single passphrase verification (in order to confirm the same passphrase is still being used for the current authentication request). Using the loyalty-customer database in this manner can significantly improve system performance.

In some embodiments, different hoteliers may use a different solution based at least in part on their network designs. For example, a hotelier may provide a set-top box that connects the in-room WLAN/LAN to the television. In this situation, when a guest checks into the hotel and is assigned to a particular room, the PAN of the guest may include (e.g., may be interconnected with) the set-top box in that room and no other room. This may ensure that video sent to the television is sourced from the guest's electronic devices and not from the electronic devices of a different guest (otherwise, adult content sourced from a different guest's electronic device may be inadvertently displayed).

In another deployment scenario, the hotelier may not provide a set-top box. Instead, the guest may bring their own (e.g., an Apple TV) and may connect it to the television. In this scenario, the PAN of the guest may not need to be tied to their room assignment.

Moreover, in some embodiments, dynamic PANs may be realized using dynamic VLAN assignments. In dynamic VLAN assignment, the end device may be assigned to a VLAN after successfully authenticating to the WLAN (or more precisely, authenticating to a AAA server). Then, a VLAN identifier may be assigned by the AAA server and communicated to the NAS (e.g., an access point) in an authentication response. Thereafter, all frames transmitted to or received from this electronic device may be forwarded on the assigned VLAN.

A hotelier may need to have as many VLANs configured in the network in their venue as there are guest rooms. Each guest room may have its own VLAN, thereby facilitating the PAN for the guest assigned to that room. When a guest checks into the hotel, a VLAN or VLAN identifier may be assigned to them for use during their stay. Note that this VLAN may not need to be bound to the room (unless the room includes a set-top box), but the network administrator in the hotel may use this binding anyway (e.g., for the sake of convenience).

If the hotelier desires to use the communication techniques, their network administrator may have to configure many VLANs in the hotel and trunk them throughout the network. They may need to be trunked everywhere, so that wherever the guest goes throughout the hotel, their PAN can 'roam' with them (thus, as their mobile electronic device roams from access point to access point, the PAN may stay intact). In addition, the hotelier may configure their infrastructure to support the extensive VLAN configuration, configure a DHCP server to allocate IP addresses for each VLAN/IP subnet, configure a default router per VLAN, etc.

Because of the complexity of configuring VLANs throughout the venue, the communication techniques may include alternatives to VLANs that are easier to deploy. Notably, the network may use mobility tunnels and modification (mapping to a new MAC address) by the network of the MAC address of the end device. However, these approaches cannot require a change to the end device.

In a system that implements the communication technique (such as FIG. 6), a DPSK server may authenticate end devices using DPSK authentication. The DPSK server may have a database in which user identifiers and their DPSK passphrases are persisted. Moreover, a AAA server may authorize end devices and select a policy for the NAS to apply. The AAA server may have access to user accounts, the PM server and the loyalty-customer database.

Furthermore, a PM server may be used by a hotelier to perform, among other functions, keeping a database or data structure containing the room number to which each guest has been assigned. Additionally, a loyalty-customer database may include a database of the loyal/frequent customers of a hotel, such as the customers that have signed up for the loyalty program of the hotel. This loyalty-customer database may be capable of persistently storing DPSK passphrases as well as the MAC addresses of electronic or end devices used by loyalty customer and their family members.

Additionally, as discussed previously, an access point may implement an IEEE 802.11 wireless interface and Ethernet (Ethernet, Ethernet II or a wired IEEE 802.3) interface. In the present discussion, an access point may be understood to mean an access point that possibly operates in conjunction with a WLAN controller or without a WLAN controller.

During operation of the system, the access points may have been configured via their controller(s) to broadcast the SSID of the hotel. Over the air, the security advertised may be WPA-personal or WPA2-personal.

Then, a guest may turn on their wireless electronic device or may bring an electronic device that is already operating into their room and, thus, into radio range of one of the access points in the hotel. The wireless electronic device may discover the WLAN being broadcast by the access point, may realize that it (the electronic device) has been configured with a PSK (or passphrase) for that SSID, and may join the network. Upon joining the network, the electronic device may begin PSK authentication.

As part of the authentication exchange, the access point, which has been configured to provide DPSK authentication for this WLAN, may send an authentication request to a DPSK server. Note that, while the communication techniques may use a RADIUS protocol, it should be understood that other protocols may be used for the authentication request as well, e.g., DIAMETER or hypertext transfer protocol or HTTP (e.g., a REST protocol). The authentication request message in RADIUS may be referred to as an access-request message and the response may be referred to as an access-accept (permit) or access-reject (deny) message. If the DPSK server successfully authenticates the electronic or end device (e.g., the DPSK server has been provisioned with the same DPSK passphrase as used by the electronic device), then the DPSK server may look up the end-user identifier associated with this passphrase. Then, the DPSK server may forward the authentication request, which may include the end-user-identifier, to the AAA server.

The AAA server may query the loyalty-customer or user database, providing the user identifier. The loyalty-customer database may respond with the guest's name.

Note that, in some deployments, a AAA server may already be present. When DPSK authentication is added, if implemented as a separate network entity (e.g., a server), it may minimize any changes to the AAA server. The AAA server may remain responsible for authorization and may make the decision as to whether to accept a successfully authenticated electronic device or not, as well as the selection of an appropriate policy for this electronic device.

Another reason for keeping the DSPK server as a separate network entity is for service scaling. For large hotel chains having a very large loyalty-customer database, the DPSK pool would typically be very large as well. As such, the computational workload for finding the matching passphrase for an authenticating electronic device can be quite large. When a DSPK service is implemented in the cloud, the number of servers handling the computational workload may be dynamically increased (or decreased) as needed. If the DPSK service were implemented in the same networking device as the AAA server, the servers may not be individually scaled according to their own computational workloads.

In some deployments, it may be advantageous to combine DPSK authentication and authorization into a single networking device, which may be referred to as a AAA server.

Next, the AAA server may query the PM server to get the room number assigned to the guest. In some deployments, the PM server may maintain a mapping between the room number and the VLAN identifier assigned to that room (such as VLAN identifier 10). In this case, the PM server may return the VLAN identifier instead of the room number. In other deployments, another networking device (e.g., the AAA server or a controller) may maintain the room number-to-VLAN identifier mapping. If the mapping is in the AAA server, the AAA server may look up the VLAN identifier based at least in part on the room number provided by the PM server. Note that, if the hotelier offers in-room set-top boxes to their guests, the PM server may maintain a mapping of room number to VLAN identifier, where the VLAN (for the specific VLAN identifier) may access the in-room television and no televisions in other rooms. However, if the hotelier does not offer in-room set-top-boxes, the PM server may simply need to keep a binding of the VLAN identifier assigned to each guest. In some embodiments, there may be a maximum of 4,096 VLAN identifiers, so this table may need to be updated continually, periodically or as needed.

Moreover, the AAA server may send to the access point an access-accept message including the VLAN identifier for the guest's room. In some embodiments, the AAA server may communicate the assigned VLAN identifier using one or more RADIUS tunnel attributes per RFC-3580.

Note that the access points may have been configured for dynamic VLANs (e.g., the access point may accept VLAN identifiers from the AAA server and tag the frames from the authenticated electronic device with this tag), and that Ethernet switches may have been configured so that the VLANs used in the hotel may be trunked on the switch ports (which may ensure that, whichever access point a guest's electronic device authenticates with, this access point can tag frames with the VLAN identifier and the switch port to which the access point is connected, so that the switch will accept the tagged frames and forward them on inside the VLAN).

Furthermore, a first end device in room 1, upon authenticating to the Wi-Fi network in the hotel, may be placed on a particular VLAN (such as VLAN 10). When a second end device belonging to the guest in room 1 associates to another access point in room 2 and authenticates to the Wi-Fi network, it may also be placed on VLAN 10, thereby forming a PAN. By extension, this PAN may be maintained wherever the guest carries their end devices throughout the Wi-Fi network in the hotel.

Additionally, a first set-top box may be connected to an Ethernet port on the access point in room 1 and may also be connected to a first television in this room (typically via HDMI). This Ethernet port may be configured to be a port-based member of VLAN 10. Consequently, frames sent to first set-top box may be forwarded only from VLAN identifier 10 and may only be accessible to a guest's end devices that are also on VLAN identifier 10. Note that a set-top box may not always be required to stream video to a television. For example, in some deployments the television may be compliant with the Digital Living Alliance (DLNA), and a video source implementing the DLNA standard may stream video (such as Ethernet frames) directly to the television. Thus, it should be understood that the use of a set-top box is for illustrative purposes only.

While the communication techniques are illustrated with the AAA server, the PM server and the loyalty-customer database as separate components, it should be understood that the loyalty-customer database may be integrated into the AAA server or the PM server.

In some deployments, configuring Ethernet switches for many VLANs throughout a property may be considered overly burdensome for network administrators. Therefore, several alternatives may be used, including some that do not include VLANs.

A first alternative is referred to as a tunneled-PAN alternative. As previously noted, there are no VLANs employed in this alternative. The sequence of events is the same as described above, however instead of returning a VLAN identifier, the AAA server may return two parameters: a home-hub identifier and a group identifier. The home-hub identifier may be the identifier for the home hub. Notably, the home hub may be the access point to which a set-top box is connected. The role of the home hub may be to forward frames from one of the guest's end devices to one or more of the other end devices in the guest's PAN, and to filter (or drop) frames sent from electronic devices that are not in the guest's PAN. As described previously, if the hotelier is providing a set-top box, the guest's end devices may be assigned to the home hub serving the room to which the guest was as signed.

The home-hub identifier-to-room number binding is typically maintained by the PM server (as discussed previously, it may also be maintained by the AAA server or the controller). If the hotelier has deployed one access point per room, the home-hub identifier may refer to the access point in a room. However, if several rooms share an access point, then the home-hub identifier may be the shared access point that is closest (as measured in hops) to a given room. The reason it may be the closest access point to the room is because most of the intra-PAN traffic may originate in-room toward destination end devices that are also in the room. By keeping the access point close to the room, the amount of the traffic in the distribution layer in the network in the hotel may be reduced or minimized (e.g., this may keep the traffic in the access layer). Note that this is an optimization, because the home hub could, in principle, be any access point in the network in the hotel. Thus, for example, if the access point closest to the guest's room became faulty, another nearby access point could be assigned as the home hub.

The AAA server may also return the group identifier. The group identifier may be the PAN identifier to which the guest's end devices are assigned. The network may forward frames from a group member only to other group members or toward the Internet. Note that if the first set-top box were connected wirelessly (instead of using Ethernet) to the access point in room 1, it may also use DPSK authentication and, in like manner, may be assigned by the AAA server to the group identifier for this room. Consequently, it will be a member of the PAN for the guest assigned to that room.

For example, assume that the first and the second end devices in room 1 associate with this access point. As a result of DPSK authentication, the access point may be informed by the AAA server that it is the home hub and that both end devices are members of group identifier 1. As such, the access point may locally forward frames between the first and the second end devices. Now, assume that the third end device (which belongs to the guest assigned to room 1) connects to the access point in room 2. As a result of DPSK authentication, this access point may be informed that the third end device is in group identifier 1 and the home hub is the access point in room 1. Because the access point in room 2 now knows it is not the home hub for the third end device, it may forward frames from the third end device toward the home hub. Once a frame is received by the home hub, the home hub may be responsible for forwarding the frame to the destination end device in the group (for unicast frames) or to flood (replicate) the frame to all group members (for broadcast and multicast frames).

The access point in room 2 may use a mobility tunnel to forward frames to the access point in room 1. Frames received in a mobility tunnel may be decapsulated by the access point in room 1 (in order to obtain the original Ethernet frame transmitted by the access point in room 2) and then may be forwarded toward the destination end device. In order to establish a mobility tunnel, the tunnel originator (the access point in room 2 in this example) needs to know how to reach the tunnel destination (the access point in room 1 in this example). The home-hub identifier may be used to determine this. There are several options for home-hub identifier. For example, the home-hub identifier maybe set to the IP address of the access point in room 1. In this case, upon receipt of the home-hub identifier, the tunnel originator knows the tunnel destination. Other examples may include the home-hub identifier being set to the name of the access point or the NAS identifier of the access point. If one of these options is used, the access point may query the controller to find or obtain the IP address of the access point using the home-hub identifier as a query parameter. Alternatively, if a controller is acting as a RADIUS proxy, it could insert the IP address of the home-hub access point as an attribute in the access-accept message before forwarding it to the NAS client/home hub (the access point in room 2 in this example).

When the home hub terminates a mobility tunnel, it may cache (or remember) the tunnel originator. Thus, when a PAN member has data to send to another PAN member that is connected via a mobility tunnel, the home hub access point may know where to send the frames (e.g., that it must use a mobility tunnel, and if more than one is currently established, which one to use).

There are a number of tunnel protocols that may be used for the mobility tunnel. For example, the tunnel protocol may include EoIP. In this protocol, the Ethernet frame received by the tunnel originator (the access point in room 2) may be embedded in an IP packet as defined in RFC-2784, GRE. Alternatively, a proprietary version of GRE may be used. In some embodiments, the tunnel protocol may include VXLAN per RFC-7348.

When a tunnel terminating home hub receives a frame encapsulated in a mobility tunnel, it may verify the authenticity of the tunnel originator (for security reasons, such as to ensure an attacker is not attempting to violate PAN restrictions). There are several means to accomplish this. One is to use a tunnel protocol that provides mutual authentication. Another way is for the tunnel terminator to verify that the source IP address is bound to an authorized (by the network administrator) tunnel originator. In this case, the tunnel terminator (the access point in room 1) may query the controller to see if the source IP address belongs to a tunnel originator (the access point in room 2). An even stronger check would be to verify that the tunnel originator has an associated end device belonging to the guest assigned to this home hub.

A variant of the tunneled-PAN alternative uses a layer-3 routing instead of switching and operates in a similar manner. In this case, each access point/home hub may incorporate a default router and dynamic host control protocol (DHCP) server functionality. When a first end device joins, its serving access point (in room 1) may be informed via a RADIUS access-accept message that it is the home hub for this end device. Therefore, when it receives a DHCP request from the first end device, it may allocate an IP address. When a third end device joins the access point in room 2, this access point may be informed that the access point in room 1 is the home hub. Therefore, the access point in room 2 may create a proxy mobile IP (PMIP) tunnel (or another IP-in-IP tunnel) to the access point in room 1 and may tunnel the packets or frames from the first end device to the access point 1. Thus, to the first end device, it may appear as if it is located in the IP subnet served by default router of the access point in room 1.

A second alternative is referred to as the mapped-MAC-address alternative. As previously discussed, there are no VLANs employed in this alternative. Instead of returning a VLAN identifier, the AAA server may return a group identifier and, optionally, a device identifier. Note that the device identifier may or may not be provided by the AAA server. For example, a controller may provide the device identifier, such as by inserting it as an attribute in the access-accept message before forwarding it to the NAS client/access point.

For example, assume the first and the second end device associate with the access point in room 1. As a result of DPSK authentication, the AAA server may inform the access point in room 1 that both end devices are members of group identifier 1. During the association process, the access point may learn the MAC addresses for the first end device and the second end device. In this alternative, when the access point to which a guest's end device is associated (the access point in room 1) receives a frame from a guest's end device, before forwarding the frame it may replace the MAC address of the end device (the source MAC address in the Ethernet frame) with a different MAC address, which may include, in part, the group identifier and the device identifier. Having thus mapped (or replaced or modified) the MAC address, the frame may be forwarded in the wired network where it is bridged or routed as usual.

As shown in Table 1, the mapped MAC address may include a MAC organizationally unique identifier, the group identifier and the device identifier. Note that the MAC organizationally unique identifier has a range of $2^{24}$ MAC addresses. In order to assure there is no conflict with any other MAC addresses present on the network in a hotel, a new MAC organizationally unique identifier may be obtained (e.g., from the IEEE) and used for MAC-mapping purposes. In this example, two bytes have been reserved for the group identifier (accommodating up to 6,5535 rooms in a hotel) and 1 byte has been reserved for the device identifier (accommodating 256 end devices per guest). However, other mapped MAC address formats are possible. In some embodiments, if the MAC organizationally unique identifier is f0:b0:52, the first end device is assigned to room 1 (group identifier 1) and the device identifier is 9, its mapped MAC address may be f0:b0:52:00:01:09.

Suppose that a first end device has a frame to send to a second end device. The access point may receive the frame, may map the source MAC address of the frame as described previously and, by inspecting the destination MAC address in the frame, may determine that the frame is destined to the second end device. Because the access point knows (from DPSK authentication) that end device is a member of group identifier 1, and because the mapped source MAC address has a matching group identifier, the access point may forward the frame to the second end device. However, if the group identifier in the mapped MAC address did not match the group identifier of the destination device, the access point would filter (or drop) the frame.

In order to further illustrate operation of the guest's PAN, suppose that the third end device (which belongs to the guest assigned to room 2) connects to the access point in room 2. As a result of DPSK authentication, the access point in room 2 may be informed that third end device is in group identifier 1 (the group assigned to the guest staying in room 1). Now suppose that the third end device has a frame to send to the first end device. The access point in room 2 may receive the frame, may map the source MAC address of the frame and, by inspection of the destination MAC address, may determine the frame is destined to an end device other than the ones which are wirelessly associated to the access point in room 2. Therefore, the access point in room 2 may forward the frame out its Ethernet interface, relying on the wired network in the hotel to get the frame to the correct access point (the one that has the first end device associated to it). When the access point in room 1 receives the frame, by inspecting the destination MAC address, the access point in room 1 may realize the frame is destined for the first end device. Because the access point in room 1 knows that the first end device is a member of group identifier 1 and group-identifier 1 is the group identifier in the source (mapped) MAC address, the access point in room 1 may forward the frame to the first end device. However, if the group identifier drawn from the source (mapped) MAC address of the frame was other than group identifier 1, the access point in room 1 would have filtered the frame.

In order to complete the explanation of frame forwarding, it may be useful to understand how ARP works when used with the mapped-MAC-address alternative. Consider again the situation when the third end device has a frame to send to the first end device. At the outset of this process, the third end device may know the IP address of the first end device but does not know its MAC address. Therefore, the third end device may send an ARP request, asking the network to supply the MAC address corresponding to the IP address for the first end device. When the ARP request arrives at the first end device, the first end device may send an ARP reply with its MAC address. Because, as described previously, network forwarding may be based at least in part on the mapped MAC address of the first end device, the access point in room 1 may replace the MAC address of the first end device inside the ARP response payload with the mapped MAC address. Thus, the third end device may now have the mapped MAC address of the first end device. Now that the ARP exchange has been completed, the third end device may send its message in a frame having its own MAC address as the source MAC address and the mapped MAC address for the first end device as the destination MAC address. Thus, both the end device sending frames and the network know the destination device by its mapped MAC address, not its native MAC address. Therefore, when the frame arrives at the access point in room 1, the access point in room 1 knowing that the first end device is a member of group identifier 1, may replace the destination MAC address in the frame with native MAC address of the first end device (otherwise, the first end device would filter the frame).

In the preceding discussion, the first end device sent the ARP reply. Alternatively, the ARP reply could have been sent by the access point in room 1 (e.g., using a proxy-ARP service). In this case, the access point in room 1 would generate the ARP reply payload using the mapped MAC address of the first end device. In some embodiments, an IPv6 neighbor solicitation may be used in a similar manner.

Moreover, in order to complete the explanation of the mapped-MAC-address alternative, how the device identifier may be determined is discussed. Because the MAC address of the electronic devices on a network must be unique, the entity supplying the device identifier may ensure a unique mapping from a native MAC address of the electronic device to its mapped MAC address. Moreover, because the group identifier will be unique for each guest staying at a hotel, a unique device identifier value may be supplied to each of the guest's electronic devices, ensuring that no device identifier is duplicated. There are several ways this can be accomplished.

Notably, the AAA server may keep a list of each guest's end devices (stored persistently in either the loyalty-card database or the AAA server). In the list, there may be a unique device identifier for each and every MAC address. As long as a single guest does not have more than 256 end devices, this approach may work. However, if more than 256 end devices are found, the server may remove from the list the end device having the oldest date/time when it last authenticated to the network (and, thus, is likely no longer being used by the guest).

Alternatively, the AAA server may keep a list of the active sessions for each guest. There will be an active session corresponding to each and every end device the guest has joined to the network. Moreover, because the maximum number of end devices for a particular guest may be limited, the AAA server may ensure that the number of sessions is always less than the number of end devices permitted by the device identifier (in the previous example, 256 end devices). If a guest's end device disassociates from the network, its session may also be deleted and the device identifier that was previously used may now be reused for a different end device. In some embodiments, a controller may perform these operations instead of the AAA server.

A third alternative is referred to as a QinQ alternative. This alternative may use VLANs but may offer a different usage of VLANs than previously described. In the QinQ alternative, a single VLAN may be configured on the Ethernet switch(es) and trunked throughout the network in the hotel. Access points in the network may be configured to use QinQ. Notably, the outer VLAN or S-VLAN may be configured to have the same VLAN identifier as the Ethernet-switching network. The AAA server may dynamically assign the inner VLAN or C-VLAN.

In the QinQ alternative, the sequence of events may be the same as described previously. However, the VLAN identifier returned by the AAA server may be interpreted by the access point as a C-VLAN identifier. Because the PAN is interconnecting the guest's wireless end devices, each guest's PAN may be assigned a unique C-VLAN identifier. When an access point forwards frames from an end device, it may take an action based at least in part on the destination MAC address of the frame. If the MAC address is the MAC address of a PAN member, then the access point may add the C-VLAN tag and the S-VLAN tag to the frame and may forward the frame upstream. Alternatively, if the MAC address is the MAC address of the default router (e.g., the frame is destined to a host on the Internet), the access point may only add the S-VLAN tag. Upon receipt of the frame, the switching infrastructure may forward the frame toward its destination.

In some embodiments, at least some of the operations of the access point(s) may be implemented by one or more switches in a network. For example, if the authentication protocol was IEEE 802.1X or an extensible authentication protocol, then a switch would be in contact with a AAA server and may directly receive a group identifier, a VLAN identifier or another policy. Alternatively, a switch may implement home-hub functionality if it were informed, e.g., by an access point of PAN-group membership.

In some embodiments of the communication techniques, a common passphrase is shared with as many electronic devices as desired. Back-end comparisons (e.g., by a AAA server or another computer) may be used to determine whether a given electronic device is allowed to access a network. This AAA server (or the other computer) may store policies for (or privileges of) the electronic devices, passphrases and/or authentication information.

In the communication techniques, a user at a hotel may select a wireless network on their cellular telephone and then may enter their passphrase (such as a PSK or a DPSK). The user may not initially be allowed to access the network in the hotel. Instead, they may have an encrypted connection to an access point, which may perform at least some of the operations in the communication technique.

As discussed previously, the passphrase may be common or shared by a group of electronic devices. In general, there may be multiple groups of electronic devices that can join the same network, each of which may have a different passphrase.

After receiving a passphrase from the access point, a AAA server may look up or access the appropriate a policy to apply to the user. For example, the policy may put the user's electronic devices on a separate virtual network (or VLAN).

Note that the passphrase may be provided to the user using email or an SMS (text) message. Alternatively, the user may receive the passphrase via an application associated with a venue or a location, such as a hotel or university housing.

In some embodiments, the communication techniques use micro-segmentation in order to allow more than 4,096 virtual networks. For example, a virtual network (for a given PAN) may be implemented using a virtual dataplane. Access points may connect to the virtual dataplane.

Notably, the virtual network may be specified using at least a 24-bit identifier, e.g., in a GRE header (which is sometimes referred to as a VNI). This may be useful in embodiments or applications where there are a large number of users, such as in university housing. When there are more students, there may be more VLANs. However, in some architectures, there may not be more than 4,096 VLANs. The 24-bits may overcome this constraint, allowing up to 16 million VLANs for micro-segmentation. In some embodiments, QinQ is used instead of VNI.

When an electronic device authenticates (using DPSK or other type of authentication), the AAA server may look up or access the VNI and may communicate it back to the access point in response to a request from the access point. This VNI may be used by the virtual dataplane, so that the virtual dataplane can bridge the traffic in this virtual network together. Thus, all packets or frames with the same VNI may be bridged together (instead of using VLANs).

In embodiments where electronic devices are connected through Ethernet jacks or ports, the communication techniques may ensure that these electronic devices are on the same VNI as wireless electronic devices. For example, a switch may take the Ethernet frames coming into your room and puts them into a VXLAN. These packets or frames may also go to the virtual dataplane, and the VNI may be put into the packet or frame headers. Consequently, the electronic devices of a given student may be connected to the same VNI.

Note that the switch may know the VNI than an electronic device belongs to based at least in part on the location of the Ethernet or communication port (such as static assignment based at least in part on my room number). Alternatively, the student may use a captive portal window in which they provide an identifier that is passed back to the switch.

For example, in a hotel room, a set-top box may be connected to a wired Ethernet port. During installation, a copy the MAC address of the port may be put into the AAA server (e.g., that the set-top box is in rom 112). Then, when the set-top box starts communicating, the AAA server will recognize it.

In some embodiments, the passphrase is communicated using a RADIUS attribute or a VSA, such as Ruckus VSA 153 (which is a DPSK VSA). Moreover, in some embodiments, the passphrase may be encrypted during at least a portion of the communication techniques. In these embodiments, the access point may selectively provide a decryption key so that the passphrase can be decrypted.

Furthermore, the passphrase may be provided during a four-way handshake. For example, frame 1 and frame 2 may provide cryptographic information that gets sent over in the RADIUS access request. This information may be enabling for the access point to subsequently receive the passphrase from the electronic device.

While the preceding embodiments illustrate the communication techniques using DPSK authentication, in other embodiments the communication techniques may be used with another authentication technique, such as a non-DPSK authentication technique. In the discussion that follows, the aforementioned embodiments are extended to include a DPSK authentication technique or a non-DPSK authentication technique. For example, the non-DPSK authentication technique may include: an EAP technique (such as PEAP), TLS certificate-based authentication, MAC authentication, or another authentication technique.

Moreover, in general, information associated with a policy that is included in the access acceptance message may include more information than allowing (or not allowing) or binary access information corresponding to access to the network. Thus, in the discussion that follows, the aforementioned embodiments are extended to include binary access information or non-binary access information.

Figure 13:
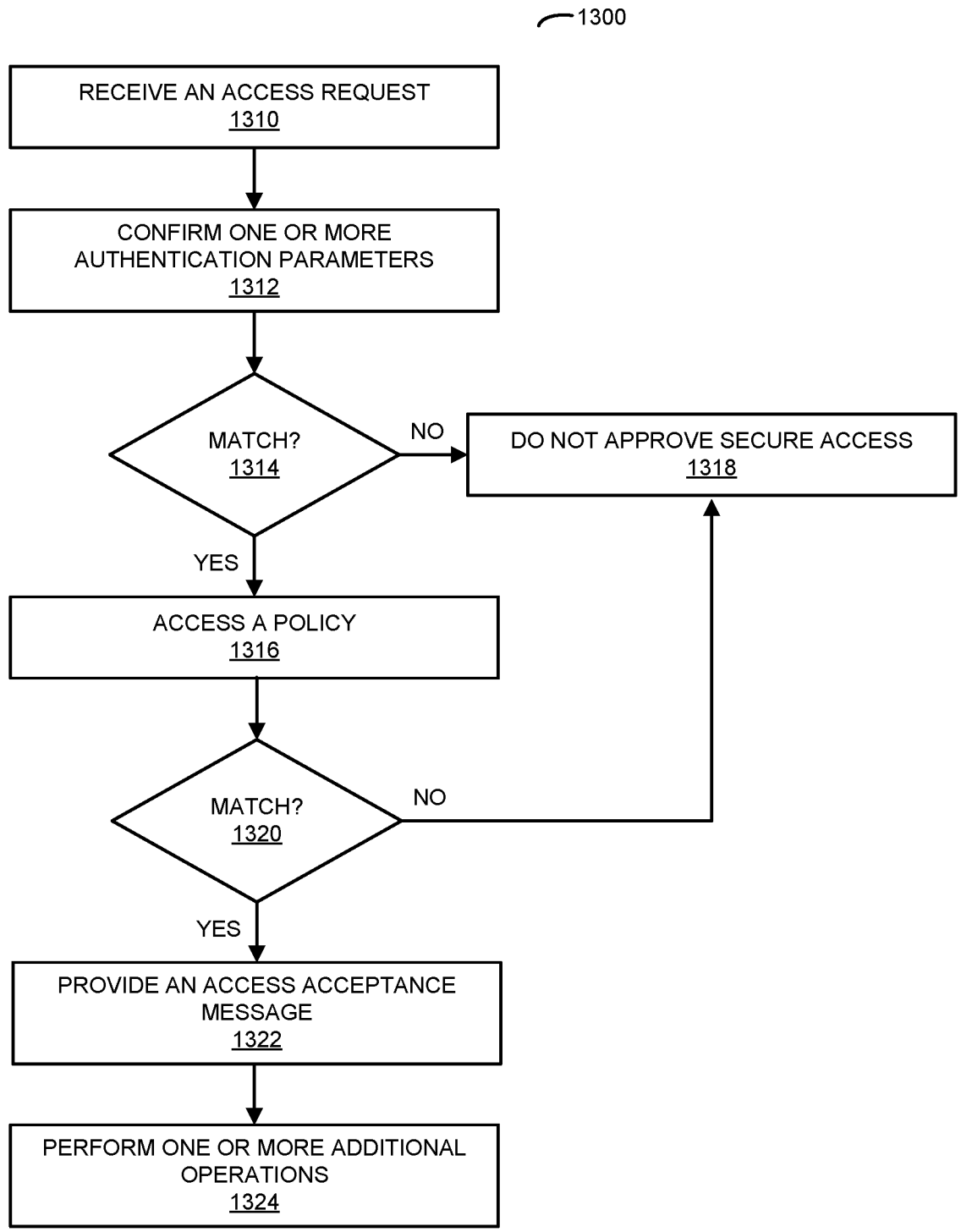
FIG. 13 is a flow diagram illustrating an example of a method for selectively providing an access acceptance message using an electronic device in FIG. 1 in accordance with an embodiment of the present disclosure.

FIG. 13 presents a flow diagram illustrating an example of a method 1300 for selectively providing secure access, which may be performed by an electronic device, such as AAA server 130 in FIG. 1. During operation, the electronic device may receive an access request (operation 1310) associated with a computer, where the access request includes one or more authentication parameters associated with a user. Note that the one or more authentication parameters may include: passphrase parameters corresponding to a passphrase (or pre-shared key) associated with the user, and the passphrase parameters include inputs to a cryptographic calculation and an output of the cryptographic calculation; an authentication certificate; or a MAC address of the second electronic device (and, more generally, an identifier of the second electronic device).

Moreover, the passphrase may include a DPSK passphrase of the user. In some embodiments, the second electronic device is included in a group of electronic devices that are associated with the user and that share the passphrase. Thus, the passphrase may include a group DPSK passphrase that is used by the group of electronic devices. However, the passphrase may not be included in the access request.

For example, the passphrase parameters may include: a random number associated with the second electronic device, a random number associated with the computer network device associated with the network, the output of the cryptographic calculation, an identifier of the second electronic device (such as the MAC address), and/or an identifier of the computer network device associated with the network (such as a MAC address of the computer network device or a NAS ID of the computer network device).

In response, the electronic device may confirm the one or more authentication parameters (operation 1312) to determine whether there is an authentication match. Notably, the confirming may include: verifying whether the authentication certificate is valid for the network; verifying whether the MAC address is included in an approved access list for the network; or performing the calculation of one or more second outputs of a cryptographic calculation based at least in part on the inputs and one or more stored passphrases. For example, the confirmation may include calculating the one or more second outputs of the cryptographic calculation based at least in part on the inputs and the one or more stored passphrases. Furthermore, the match may be between one of the one or more second outputs and the output.

Moreover, when there is an authentication match (operation 1314), the electronic device may access a policy (operation 1316) associated with or that includes: a spatial criterion, a temporal criterion, information associated with the user, information associated with the one or more authentication parameters, or information associated with the network. Otherwise, the electronic device may not approve the secure access (operation 1318).

Note that the spatial criterion may include a location where the access to the network is allowed. For example, the location may include: a room (such as hotel room), a building or property (which may include the computer network device associated with the network), a location of the network, a communication port, a facility associated with the organization (such as a hotel or an education institution), a property, etc.

Moreover, the temporal criterion may include a time interval or a day of the week when access to the network is allowed. For example, the temporal criterion may include a time interval when the one or more authentication parameters may be valid for the network, and at other times the one or more authentication parameters may be valid for a second network. Furthermore, the information associated with the user may include an identifier of the user (such as a username) or a group that includes the user. Additionally, the information associated with the network may include a MAC address or a NAS ID of the computer network device.

Then, when one or more criteria associated with the policy are met (operation 1320), the electronic device may selectively provide an access acceptance message (operation 1322) addressed to the computer, where the access acceptance message is intended for the second electronic device and includes information for establishing the secure access of the second electronic device to a network and includes an attribute associated with the policy. For example, the second electronic device may, at least in part, use the information to encrypt/de-encrypt communication and/or to establish a tunnel. Otherwise, the electronic device may not approve the secure access (operation 1318).

In some embodiments, the attribute may include an instruction specifying the network. Thus, the access acceptance message may include more information than allowing or not allowing or binary access information corresponding to access to the network. For example, the attribute may direct the second electronic device to access a particular network based at least in part on the one or more criteria. However, in other embodiments, the attribute may include binary access information corresponding to access to the network.

In some embodiments, the electronic device may optionally perform one or more additional operations (operation 1324). For example, the interface circuit may communicate with a second computer (such as a PM server associated with an organization) to determine whether the second electronic device is associated with the location. When the second electronic device is associated with the location, the electronic device may selectively provide the access acceptance message.

Note that the policy may allow the user to access multiple networks at different locations or at different times based at least in part on the one or more authentication parameters. In these embodiments, the one or more authentication parameters may include a given identifier of a given network. For example, the inputs used to calculate the one or more second outputs of the cryptographic calculation may include the given identifier of a given network. Moreover, the one or more stored passphrases may be organized based at least in part on identifiers of different networks. For example, pools of passphrases may be bound to or associated with the different networks to reduce computational workload.

Furthermore, the second electronic device may be pre-configured with the one or more authentication parameters, such as the passphrase. Note that the passphrase may be independent of the identifier associated with the second electronic device, such as the MAC address of the second electronic device. More generally, the passphrase may be independent of the second electronic device or hardware in the second electronic device. However, in other embodiments the one or more authentication parameters may include the MAC address of the second electronic device.

Additionally, in some embodiments, the MAC address of the second electronic device is bound to or associated with the passphrase in the electronic device, so that the second electronic device can be authenticated by the electronic device on subsequent occasions without the electronic device having to perform the cryptographic calculation. However, in some embodiments, even when such MAC-address caching is used, the electronic device may perform the cryptographic calculation during an instance of a subsequent authentication request in order to ensure that the passphrase parameters and/or cryptographic information is unchanged and is still accurate. Note that when MAC-address caching is used, only a single cryptographic calculation may need to be performed for the second electronic device (as opposed to a brute-force search through a larger set of possible passphrases).

Note that the operations provide dynamic access to the network without additional action by the user or an administrator of the network.

Moreover, the network may include a virtual network associated with the location (such as a virtual network for the PAN), and the information in the access acceptance message may allow the second electronic device to establish secure communication with the virtual network. This secure communication may be independent of traffic associated with other users of the network. For example, the computer network device may bridge traffic between the second electronic device and the group of electronic devices in the virtual network in the network, where the traffic in the virtual network is independent of other traffic associated with one or more different virtual networks in the network. Note that the virtual network may include: a VLAN or a VXLAN.

In some embodiments, the virtual network is specified by an identifier that is included in the access acceptance message. For example, the identifier may include a VLANID or a VNI. Moreover, the identifier may include information that is capable of specifying more than 4,096 virtual networks. Alternatively or additionally, the virtual network may include: QinQ, mobility tunnels (e.g., using Home Hub and group identifiers) and/or a MAC address mapping procedure.

Furthermore, the access request may include a RADIUS access request and the access acceptance message may include a RADIUS access acceptance message. Note that the one or more authentication parameters may be included in a RADIUS attribute, such as a VSA. Alternatively, in some embodiments, an HTTP or HTTP-based protocol (such as HTTPv2, websockets or gRPC) may be used.

Additionally, the policy is accessed in a third computer, such as a PM or loyalty computer. Moreover, the policies in the third computer may be used to enable or disable passphrases (and, more generally, access) when guests check in or out of a hotel.

In some embodiments of method 1300, there may be additional or fewer operations. Furthermore, the order of the operations may be changed, and/or two or more operations may be combined into a single operation.

Figure 14:
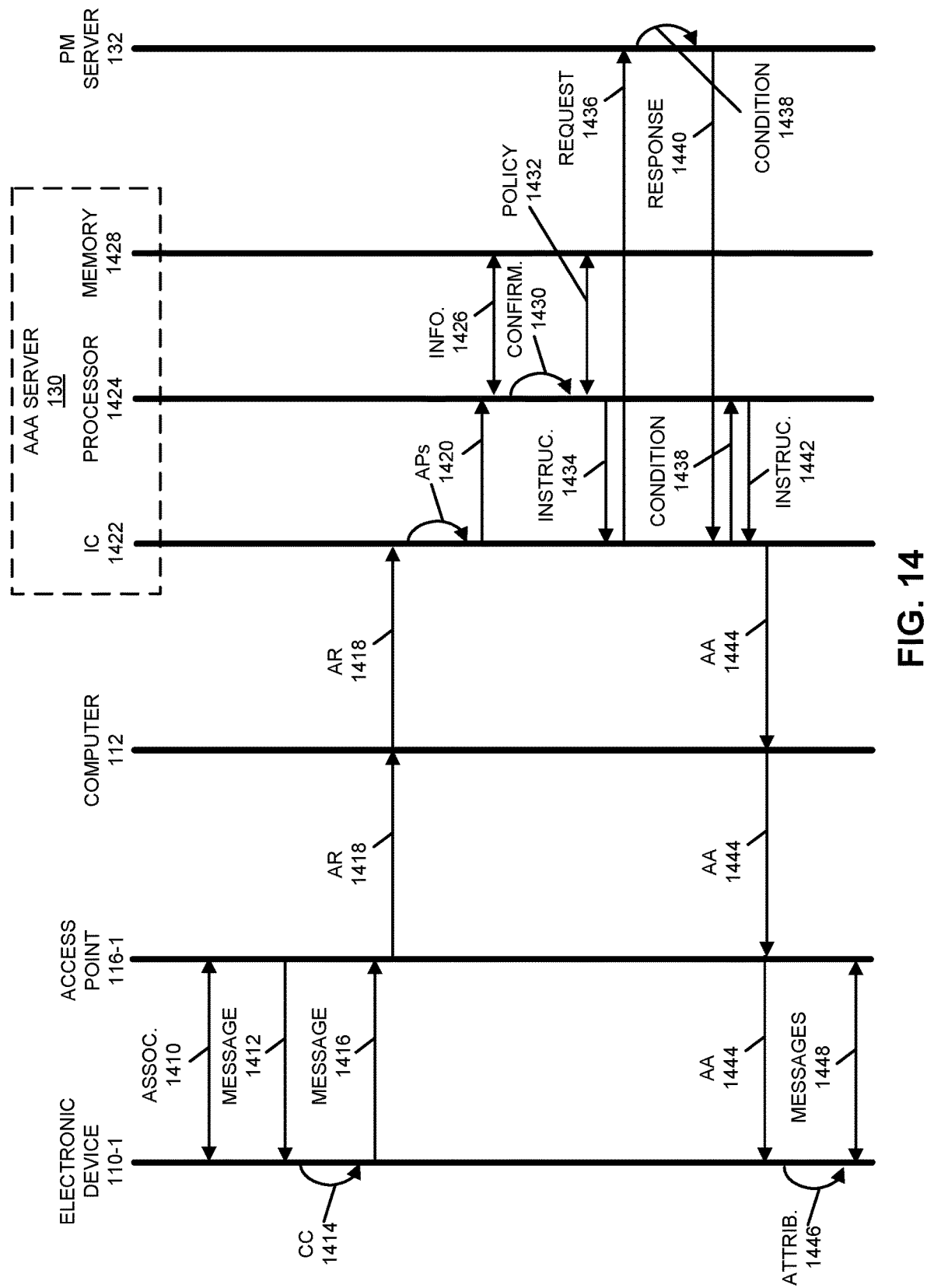
FIG. 14 is a drawing illustrating an example of communication among the electronic devices in FIG. 1 in accordance with an embodiment of the present disclosure.

Embodiments of the communication techniques are further illustrated in FIG. 14, which presents a drawing illustrating an example of communication among electronic device 110-1, access point 116-1, computer 112, AAA server 130 and PM sever 132. In FIG. 14, an interface circuit in electronic device 110-1 may discover and associate 1410 with access point 116-1 via an interface circuit in access point 116-1.

Then, the interface circuit in electronic device 110-1 may provide a message 1416 to access point 116-1 with one or more authentication parameters (APs) 1420 that are associated with a user. For example, the one or more authentication parameters 1420 may include: an authentication certificate; or a MAC address of electronic device 110-1 (and, more generally, an identifier of electronic device 110-1).

In some embodiments, electronic device 110-1 may use a DPSK authentication technique. For example, the interface circuit in access point 116-1 may provide a message 1412 with a random number that is associated with access point 116-1 (such as an ANonce). After receiving message 1412, electronic device 110-1 (such as a processor in electronic device 110-1) may perform a cryptographic calculation (CC) 1414 using a passphrase (such as a DPSK passphrase), the random number from access point 116-1, a random number associated with electronic device 110-1 (such as an SNonce), an identifier of access point 116-1 (such as a MAC address), and/or an identifier of electronic device 110-1 (such as a MAC address). Moreover, the interface circuit in electronic device 110-1 may provide a message 1416 with inputs to the cryptographic calculation 1414 and an output of the cryptographic calculation 1414. For example, message 1416 may include the random number associated with electronic device 110-1 and a MIC.

After receiving message 1416, the interface circuit in access point 116-1 may provide an access request (AR) 1418 to computer 112. This access request may include the one or more authentication parameters 1420. For example, the one or more authentication parameters 1420 may include passphrase parameters corresponding to the passphrase associated with the user of electronic device 110-1, such as: inputs to the cryptographic calculation 1414 and an output of the cryptographic calculation 1414. Moreover, after receiving access request 1418, an interface circuit in computer 112 may provide access request 1418 to AAA server 130.

Furthermore, after receiving access request 1418, an interface circuit 1422 in AAA server 130 may provide the one or more authentication parameters 1420 to a processor 1424 in AAA server 130. Processor 1424 may confirm 1430 the one or more authentication parameters 1420 to determine whether there is a match. For example, processor 1424 may access stored information 1426 in memory 1428 in AAA server 130, such as: one or more stored authentication certificates (or information corresponding to the one or more authentication certificates, such as whether or not a given authentication certificate is expired); or an approved access list for a network (which may include MAC addresses or identifiers of electronic devices). In these embodiments, the confirmation 1430 may involve a comparison of the one or more authentication parameters 1420 with the stored information 1426. Alternatively, processor 1424 may perform calculations of outputs of the cryptographic calculation 1414 using passphrase parameters in the one or more authentication parameters 1420 and stored passphrases in the stored information 1426.

When there is a match between the one or more authentication parameters 1420 and the stored information 1426 (such as a match between one of the calculated outputs and the output received from electronic device 110-1), processor 1424 may access a policy 1432 in memory 1428. For example, policy 1432 may indicate that secure access to a network is allowed when one or more criteria (or conditions) are met, such as when the user is at a location and/or during a time interval. Note that the one or more criteria may include a positive criterion, a negative criterion or both.

In some embodiments, processor 1424 may instruct 1434 interface circuit 1422 to confirm that electronic device 110-1 is at the location (and, more generally, confirm a condition 1438) by providing a request 1436 to PM server 132. After an interface circuit in PM server 132 receives request 1436, a processor in PM server 132 may determine that electronic device 110-1 is at the location. For example, access point 116-1 or a communication port may be associated with the location, and/or the user may be associated with the location (such as a hotel room or a dorm room at a college or a university), and the processor in PM server 132 may determine that electronic device 110-1 is at the location by performing a lookup in memory in PM server 132. Next, the interface circuit in PM sever 132 may provide a response 1440 with the confirmation.

After interface circuit 1422 receives response 1440 and provides information about condition 1438 to processor 1424, processor 1424 may instruct 1442 interface circuit 1422 to provide an access acceptance message (AAM) 1444 to electronic device 110-1 with information for establishing secure access of electronic device 110-1 to a network and an attribute 1446 associated with policy 1432. Note that, in general, attribute 1446 may include binary access information (allow access or not), or may include non-binary access information (such as allow access to a school network during school hours, and a different network outside of school hours).

Then, after receiving access acceptance message 1444, the interface circuit in computer 112 may provide access acceptance message 1444 to access point 116-1. Moreover, after receiving access acceptance message 1444, electronic device 110-1 may access the network based at least in part on information included or specified in access acceptance message 1444, such as attribute 1446. For example, the interface circuit in access point 116-1 and the interface circuit in electronic device 110-1 may exchange additional messages 1448 to complete the four-way handshake. Furthermore, based at least in part on the information in access acceptance message 1444, access point 116-1 and electronic device 110-1 may establish secure access of electronic device 110-1 to the network.

While FIG. 14 illustrates communication between components using unidirectional or bidirectional communication with lines having single arrows or double arrows, in general the communication in a given operation in this figure may involve unidirectional or bidirectional communication. Moreover, while FIG. 14 illustrates operations being performed sequentially or at different times, in other embodiments at least some of these operations may, at least in part, be performed concurrently or in parallel.

Thus, the communication techniques may allow for flexible or dynamic authentication without further action by a user or a network administrator. For example, a DPSK passphrase may be adapted for use in different VLANs in different buildings or locations. Similarly, TLS certificate-based authentication (in which permissions are hardcoded into a TLS certificate) may be dynamically adapted based at least in part on one or more criteria or conditions, thereby providing certificate-level security and flexibility.

In some embodiments of the communication techniques, DPSK is used to provide secure access and simplicity by providing an electronic device or a user a PSK credential. Traditional PSKs are shared by all users on a WLAN, providing simple secure access, but without electronic device or user authentication. If the PSK or passphrase is compromised, traffic for the entire WLAN may be subject to eavesdropping and decryption by another passive observer. Furthermore, in order to maintain security, the electronic devices on the WLAN will need to be re-provisioned in the event of such a passphrase compromise. Note that this is true for a wide variety of types of passphrase compromises, including: intentional or unintentional sharing, cracking, or electronic-device theft.

In contrast, in DPSK provides associated electronic device passphrases, which are used for authentication and to create encryption keys. By provisioning a given electronic device with a DPSK passphrase, the benefits of per-electronic device or per-user credentials in IEEE 802.1X are achieved, but with the usability and the network simplicity benefits of PSK. Note that credentials may be created and revoked individually and controlled with expiration time intervals. Moreover, a given DPSK passphrase may be tied to a unique role or policy (even on a single WLAN), such as a VLAN assignment, access control lists (ACLs), rate limits, etc.

In some embodiments of the communication techniques, a policy engine (which is sometimes referred to as an 'authentication engine') is used to make decisions on RADIUS attributes to be returned based at least in part on inputs provided by a user or an electronic device of the user, an access point (or computer network device), and/or a network controller. As a user and/or an electronic device of the user authenticates, the policy engine may evaluate the inputs from the user or the electronic device of the user, access point and/or network controller and return one or more RADIUS attributes based at least in part on the inputs (such as one or more criteria or conditions associated with or specified by the inputs). The RADIUS attributes may be sent from the policy engine back to the electronic device of the user, access point, and or/network controller and the policy may be applied. The policy engine can be provided on customer premise and/or public or private cloud infrastructures. Thus, the policy engine may be implemented locally and/or remotely. Note that the policy engine may be a separate service from the access point and the network controller.

In existing approaches, a DPSK passphrase may be static. In these approaches, while a DPSK passphrase may be tied to a VLAN and/or a user role/traffic profile, the DPSK passphrase may not be changed after the DPSK passphrase is created. Consequently, in the existing approaches a different attribute cannot be returned.

In an example of the existing approaches, a network administrator may create a DPSK passphrase. The network administrator may associate the DPSK passphrase to a VLAN, and may distribute the DPSK passphrase to the end user. The end user may use the DPSK passphrase to join a network. Notably, the electronic device of the end user may be placed in the VLAN assigned by the network administrator.

However, if a user roams to a new location where the original VLAN was not present, the user will not get on the network. The only solution is to provide the user with a new DPSK passphrase that they can use and that is associated with the desired VLAN in the new location.

For example, in the existing approaches, the end user receives their DPSK passphrase. This DPSK passphrase may be statically tied to VLAN 777. The end user may use the DPSK passphrase to access VLAN 777 when they are in building 1. When the end user is in building 2, they may want to connect to the same network that they used in building 1. However, because their DPSK passphrase is statically tied to VLAN 777 and VLAN 777 does not exist in building 2, the end user is unable to access the network.

In contrast, in the communication techniques the policy engine may enable returned attributes to be different based at least in part on one or more criteria or one or more conditions. Without the capabilities of the policy engine, the attributes returned are static and are unable to be modified, added or changed during authentication.

For example, in the preceding example, the policy engine may provide the end user the correct VLAN based at least in part on one or more conditions, such as the presence of the end user in building 2. Thus, when the end user connects to network in building 2 using their DPSK passphrase, an access point may provide information specifying the location of the end user (or the electronic device of the end user) in building 2 to the policy engine. The policy engine may evaluate a condition or a criterion (location equals 'building 2'). In response, the policy engine may return an attribute based at least in part on this condition or criteria, such as an attribute that specifies VLAN 989. Then, the access point may provide information specifying VLAN 989 to the electronic device of the end user, and the end user may connect to VLAN 989.

Figure 15:
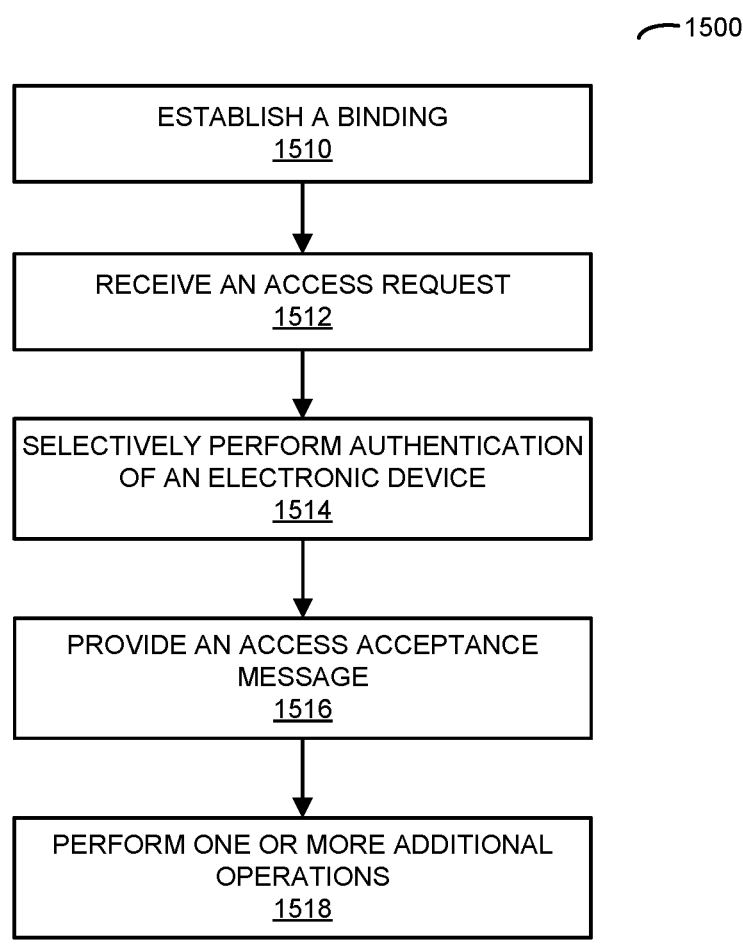
FIG. 15 is a flow diagram illustrating an example of a method for selectively providing an access acceptance message using a computer in FIG. 1 in accordance with an embodiment of the present disclosure.

We now describe embodiments of the communication techniques that may be used with WPA3. FIG. 15 presents a flow diagram illustrating an example of a method 1500 for selectively providing an access acceptance message, which may be performed by a computer, such as computer 112 (FIG. 1) and/or AAA server 130 (FIG. 1). During operation, the computer may establish a binding (operation 1510) between a passphrase (such as a DPSK passphrase) associated with an electronic device that accesses a network secured using WPA or WPA2 and/or a second network secured using WPA3, where the binding is based at least in part on an identifier associated with the electronic device. For example, the identifier may include a MAC address of the electronic device. Moreover, the binding may be established by storing an association between the identifier and the passphrase in memory. Notably, the binding may be established when the electronic device previously joined the network based at least in part on the passphrase, such as when the electronic device was authenticated by the computer by performing multiple cryptographic calculations based at least in part on stored passphrases until a match with the outputs from a cryptographic calculation is found. In some embodiments, the passphrase is associated with a user of the electronic device. However, in other embodiments, the passphrase is only associated with the electronic device. As discussed further below, note that the second network (such as a second WLAN having a second SSID) may be the same as or different from the network (such as a WLAN having an SSID). Thus, depending on the embodiment, the network and the second network may have the same or different SSIDs.

Then, the computer may receive an access request (operation 1512) associated with the electronic device and via a computer network device (such as an access point, a router or a switch), where the access request is for the electronic device to join the second network, and the access request is compatible with WPA3 and includes a second identifier. For example, the second identifier may include a second MAC address of the electronic device, which may be the same as or different from the identifier (such as when the second identifier includes a dynamic MAC address).

Moreover, the computer may selectively perform authentication of the electronic device (operation 1514), where the selective performing is based at least in part on the identifier and the second identifier, and the authentication is based at least in part on the binding, the second identifier and the passphrase. For example, the selective performing of the authentication (operation 1514) may occur when the second identifier is the same as the identifier. Furthermore, during the authentication, the computer may look up the passphrase using the second identifier and the binding (such as the stored association between the identifier and the passphrase). When the look up is successful (e.g., there is a stored association for the second identifier), the authentication may be successful. In some embodiments, the authentication may be deemed successful when the lookup is successful and when one or more criteria associated with a policy are met (as described further below.) Thus, the authentication may not involve a cryptographic calculation. Alternatively, only a single cryptographic calculation may need to be performed for the electronic device (as opposed to a brute-force search through a larger set of possible passphrases).

Next, when the authentication is successful, the computer may provide, addressed to the electronic device and via the computer network device, an access acceptance message (operation 1516), where the access acceptance message is intended for the electronic device and includes information for establishing the secure access of the electronic device to the second network, and the access acceptance message is compatible with WPA3. For example, the electronic device may, at least in part, use the information to encrypt/decrypt communication and/or to establish a tunnel.

In some embodiments, the computer may optionally perform one or more additional operations (operation 1518). For example, establishing the binding (operation 1510) may involve: providing, addressed to the electronic device and via the computer network device, an address of a registration portal (such as a web page where a user of the electronic device can provide the identifier); and receiving, associated with the electronic device, the identifier (e.g., via the registration portal. Note that the binding may be established (operation 1510) prior to the computer receiving the access request (operation 1512). Moreover, the access request may include a RADIUS access request and the access acceptance message may include a RADIUS access acceptance message.

Furthermore, when the second identifier includes a dynamic MAC address (and, more generally, when the second identifier is different from the identifier), instead of selectively performing the authentication (operation 1514) the electronic device based at least in part on the passphrase, the computer may have the electronic device join the network, where joining the network involves performing second authentication of the electronic device based at least in part on the passphrase, and performing the second authentication involves second communication with the electronic device via the computer network device, and the second communication is compatible with WPA2. Notably, during the second authentication, the computer may receive, associated with the electronic device and via the computer network device, passphrase parameters corresponding to the passphrase, where the passphrase parameters include inputs to the cryptographic calculation and an output of the cryptographic calculation. In response, the computer may calculate one or more second outputs of the cryptographic calculation based at least in part on the inputs and at least the passphrase. Moreover, when there is a match between one of the one or more second outputs and the output, the computer may optionally access a policy associated with the electronic device. Then, when one or more criteria associated with the policy are met, the computer may deem the second authentication successful. Furthermore, the computer may establish a second binding of between the passphrase associated with the electronic device of the network and the second network, where the second binding is based at least in part on the second identifier. Next, when the second authentication is successful, the computer may allow the electronic device to join the second network. In some embodiments, the computer may instruct the electronic device to join the second network by performing a basic service set (BSS) transition from the network to the second network.

Note that the passphrase parameters may include: a random number associated with the electronic device, a random number associated with the computer network device, the output of the cryptographic calculation, the identifier of the electronic device, and/or an identifier of the computer network device (such as a MAC address of the computer network device). In some embodiments, the passphrase parameters may be included in a RADIUS attribute, such as a VSA. Alternatively, in some embodiments, an HTTP or HTTP-based protocol (such as HTTPv2, websockets or gRPC) may be used.

Additionally, the policy may include a time interval when the passphrase is valid. In some embodiments, the policy may include a location where the passphrase is valid (such as a location of the computer network device) or the network or the second network that the electronic device is allowed to access. For example, the interface circuit may communicate with a second computer (such as a property management or PM server associated with an organization) to determine whether the electronic device is associated with the location. When the electronic device is associated with the location, the computer may selectively provide the access acceptance message. Note that the location may include: a room, a building, a communication port, a facility associated with the organization (such as a hotel or an education institution), etc.

Alternatively or additionally, when the network and the second network have the same SSID, instead of selectively performing the authentication (operation 1514) of the electronic device based at least in part on the passphrase, the computer may have the electronic device join the network, where joining the network involves performing second authentication of the electronic device based at least in part on the passphrase (and optionally the policy), and performing the second authentication involves second communication with the electronic device via the computer network device, and the second communication is compatible with WPA2. Then, when the second authentication is successful, the computer may allow the electronic device to join the second network.

In some embodiments, the identifier may be the same as the second identifier. When this occurs, instead of selectively performing the authentication (operation 1514) of the electronic device based at least in part on the passphrase, the computer may have the electronic device join the network, where joining the network involves performing second authentication of the electronic device based at least in part on the passphrase (and optionally the policy), and the performing second authentication involves second communication with the electronic device via the computer network device, and the second communication is compatible with WPA2. Then, when the second authentication is successful, the computer may allow the electronic device to join the second network.

Moreover, the network and the second network may include a WLAN or a virtual network that may be associated with a location (such as a virtual network for a PAN). Note that the virtual network may include: a VLAN or a VXLAN.

Furthermore, in some embodiments, when the electronic device attempts to join the second network, the computer may force the electronic device to first join the network. This may include performing authentication using DPSK authentication using communication that is compatible with WPA or WPA2. Then, the computer may instruct the electronic device to perform a BSS transition from the network to the second network.

In some embodiments of method 1500, there may be additional or fewer operations. Furthermore, the order of the operations may be changed, and/or two or more operations may be combined into a single operation.

Figure 16:
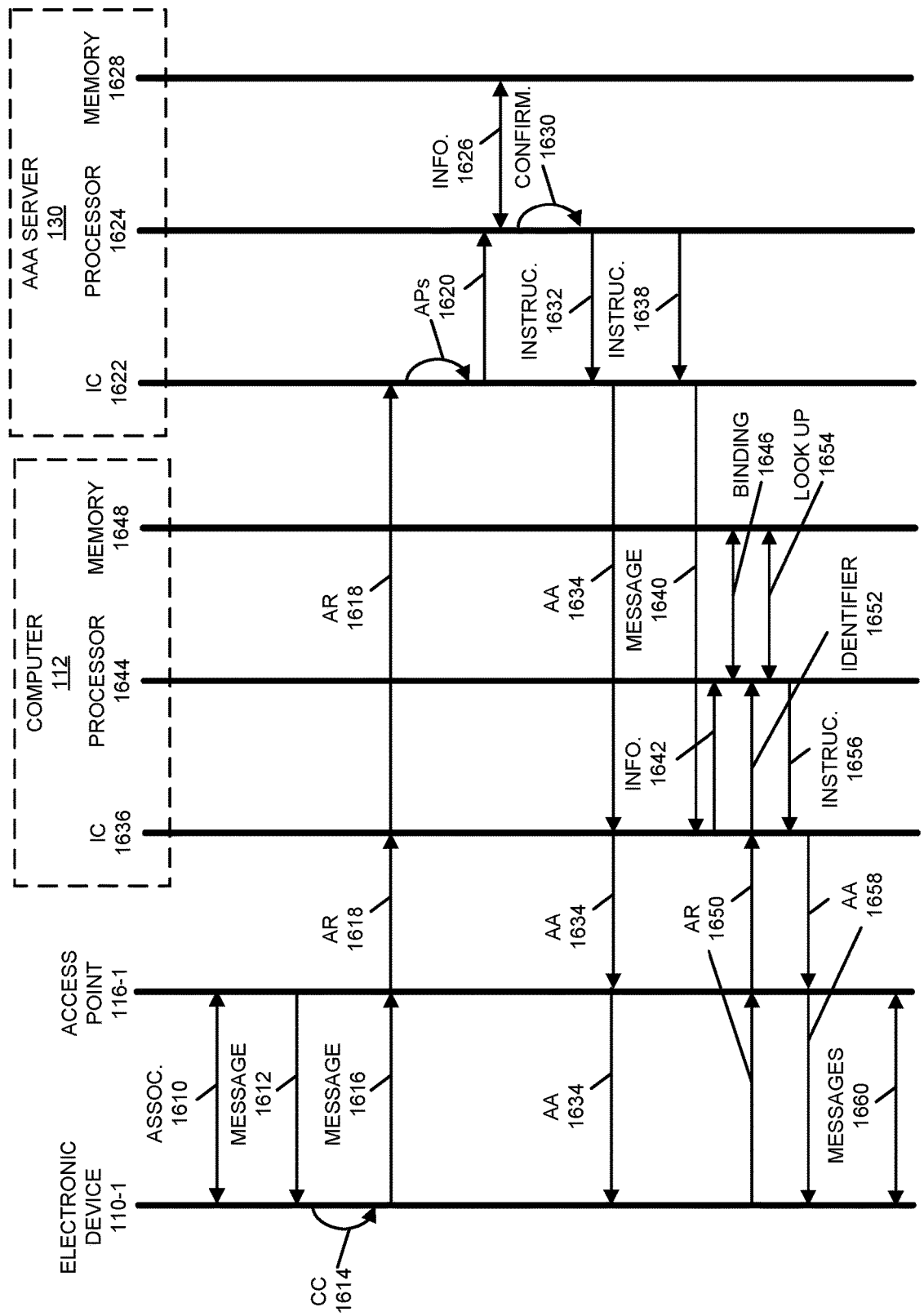
FIG. 16 is a drawing illustrating an example of communication among the electronic devices in FIG. 1 in accordance with an embodiment of the present disclosure.

Embodiments of the communication techniques are further illustrated in FIG. 16, which presents a drawing illustrating an example of communication among electronic device 110-1, access point 116-1, computer 112 and AAA server 130. In FIG. 16, an interface circuit in electronic device 110-1 may discover and associate 1610 with access point 116-1 via an interface circuit in access point 116-1.

Then, the interface circuit in electronic device 110-1 may provide a message 1616 to access point 116-1 with one or more authentication parameters (APs) 1620 that are associated with electronic device 110-1 or a user of electronic device 110-1. For example, the one or more authentication parameters 1620 may include: an authentication certificate; or a MAC address of electronic device 110-1 (and, more generally, an identifier of electronic device 110-1). Note that message 1616 may be compatible with WPA or WPA2.

In some embodiments, electronic device 110-1 may use a DPSK authentication technique. For example, the interface circuit in access point 116-1 may provide a message 1612 (which may be compatible with WPA or WPA2) with a random number that is associated with access point 116-1 (such as an ANonce). After receiving message 1612, electronic device 110-1 (such as a processor in electronic device 110-1) may perform a cryptographic calculation (CC) 1614 using a passphrase (such as a DPSK passphrase), the random number from access point 116-1, a random number associated with electronic device 110-1 (such as an SNonce), an identifier of access point 116-1 (such as a MAC address), and/or an identifier of electronic device 110-1 (such as a MAC address). Moreover, the interface circuit in electronic device 110-1 may provide a message 1616 with inputs to the cryptographic calculation 1614 and an output of the cryptographic calculation 1614. For example, message 1616 may include the random number associated with electronic device 110-1 and a MIC.

After receiving message 1616, the interface circuit in access point 116-1 may provide an access request (AR) 1618 to computer 112, where access request 1618 may be compatible with WPA or WPA2. This access request may include the one or more authentication parameters 1620 and may be compatible with WPA or WPA2. For example, the one or more authentication parameters 1620 may include passphrase parameters corresponding to the passphrase associated with the user of electronic device 110-1, such as: inputs to the cryptographic calculation 1614 and an output of the cryptographic calculation 1614. Moreover, after receiving access request 1618, an interface circuit 1636 in computer 112 may provide access request 1618 to AAA server 130.

Furthermore, after receiving access request 1618, an interface circuit 1622 in AAA server 130 may provide the one or more authentication parameters 1620 to a processor 1624 in AAA server 130. Processor 1624 may confirm 1630 the one or more authentication parameters 1620 to determine whether there is a match. For example, processor 1624 may access stored information 1626 in memory 1628 in AAA server 130, such as: one or more stored authentication certificates (or information corresponding to the one or more authentication certificates, such as whether or not a given authentication certificate is expired); or an approved access list for a network (which may include MAC addresses or identifiers of electronic devices). In these embodiments, the confirmation 1630 may involve a comparison of the one or more authentication parameters 1620 with the stored information 1626. Alternatively, processor 1624 may perform calculations of outputs of the cryptographic calculation 1614 using passphrase parameters in the one or more authentication parameters 1620 and stored passphrases in the stored information 1626.

When there is a match between the one or more authentication parameters 1620 and the stored information 1626 (such as a match between one of the calculated outputs and the output received from electronic device 110-1), processor 1624 may instruct 1632 interface circuit 1622 to provide an access acceptance message (AAM) 1634 to electronic device 110-1 with information for establishing secure access of electronic device 110-1 to a network.

Then, after receiving access acceptance message 1634, the interface circuit 1636 in computer 112 may provide access acceptance message 1634 to access point 116-1. Moreover, after receiving access acceptance message 1634, electronic device 110-1 may securely access the network based at least in part on information included or specified in access acceptance message 1634.

Moreover, when there is the match between the one or more authentication parameters 1620 and the stored information 1626, processor 1624 may instruct 1638 interface circuit 1622 to provide a message 1640 to computer 112 with information 1642, such as an identifier of electronic device 110-1 and the passphrase. After receiving message 1640, interface circuit 1636 may provide information 1642 to a processor 1644 in computer 112, which may establish a binding 1646 between the identifier and the passphrase associated with electronic device 110-1 that accesses a network secured using WPA or WPA2 and/or a second network secured using WPA3. For example, processor 1644 may store binding 1646 in memory 1648 in computer 112.

Then (e.g., after electronic device 110-1 has de-associated from the network), the interface circuit in electronic device 110-1 may provide an access request (AR) 1650 to computer 112 via access point 116-1, where access request 1650 is for electronic device 110-1 to join the second network, and access request 1650 may be compatible with WPA3 and includes a second identifier 1652. After receiving access request 1650, interface circuit 1636 may provide second identifier 1652 to processor 1644, which performs a lookup 1654 in memory 1648 based at least in part on the binding and second identifier 1652. When lookup 1654 is successful (or when second identifier 1652 matches the identifier, so there is an association between second identifier 1652 and the passphrase), processor 1644 may deem authentication of electronic device 110-1 successful.

Next, when the authentication is successful, processor 1644 may instruct 1656 interface circuit 1636 to provide an access acceptance message 1658 to electronic device 110-1, where access acceptance message 1658 is compatible with WPA3. Moreover, after receiving access acceptance message 1658, electronic device 110-1 may securely access the network based at least in part on information included or specified in access acceptance message 1658. For example, the interface circuit in access point 116-1 and the interface circuit in electronic device 110-1 may exchange additional messages 1660 to complete the four-way handshake. Furthermore, based at least in part on the information in access acceptance message 1658, access point 116-1 and electronic device 110-1 may establish secure access of electronic device 110-1 to the second network.

While FIG. 16 illustrates communication between components using unidirectional or bidirectional communication with lines having single arrows or double arrows, in general the communication in a given operation in this figure may involve unidirectional or bidirectional communication. Moreover, while FIG. 14 illustrates operations being performed sequentially or at different times, in other embodiments at least some of these operations may, at least in part, be performed concurrently or in parallel. Thus, the communication techniques may allow a passphrase (such as a DPSK passphrase) to be used in WLAN in which association and/or authentication communication is compatible with WPA3.

We now describe other embodiments of the communication techniques. Note that these embodiments may include one or more operations, features and/or aspects of the preceding embodiments.

Figure 17:
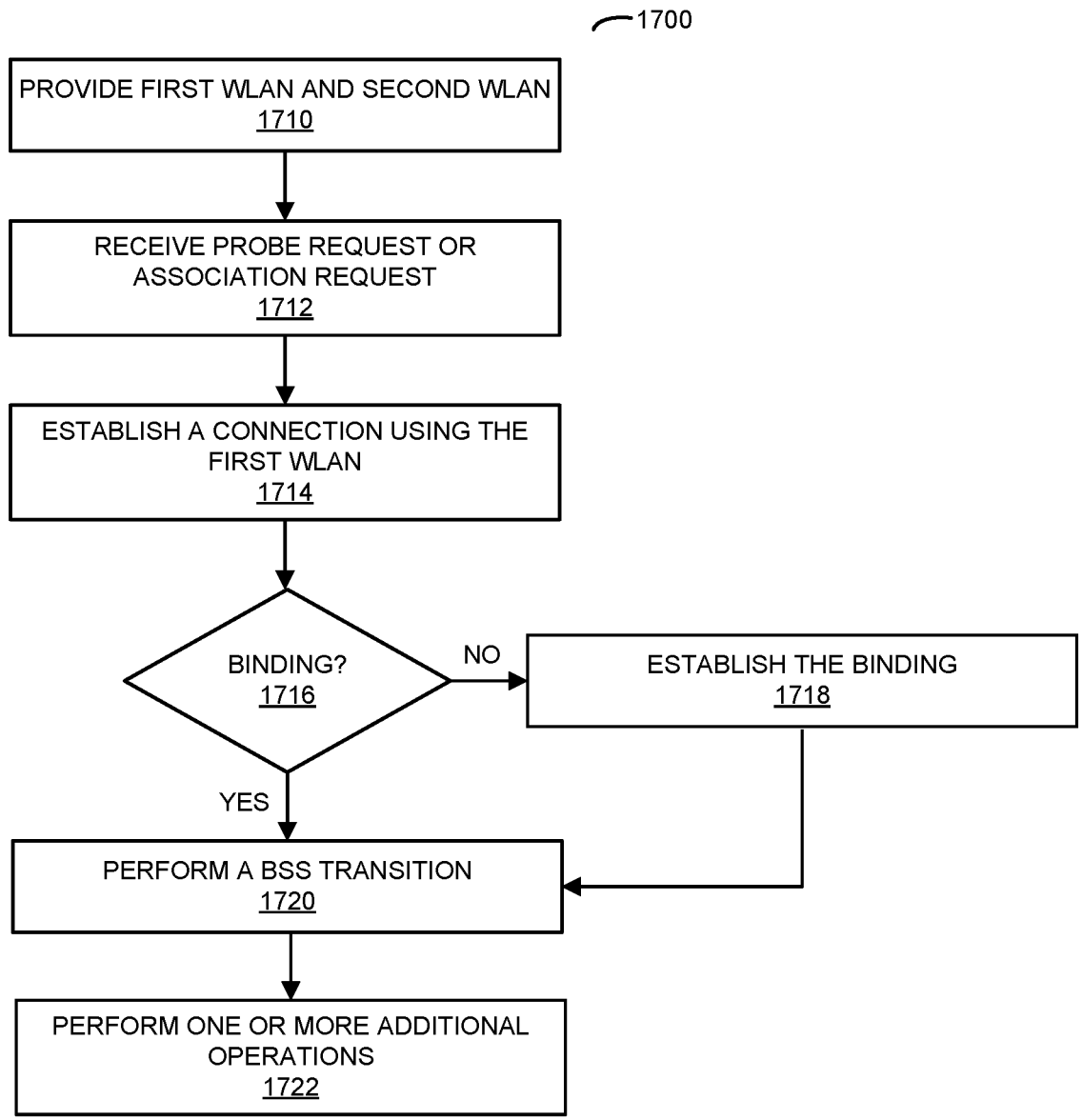
FIG. 17 is a flow diagram illustrating an example of a method for establishing a connection using an access point in FIG. 1 in accordance with an embodiment of the present disclosure.

FIG. 17 presents a flow diagram illustrating an example of a method 200 for establishing a connection, which may be performed by a computer network device, such as one of access points 116, one of radio nodes 118 or switch 128 in FIG. 1. During operation, the computer network device may provide a first WLAN and a second WLAN (operation 1710), where the first WLAN uses a WPA2-compatible authentication protocol and the second WLAN uses a WPA3-compatible authentication protocol. After receiving an association request or a probe request (operation 1712) associated with (or from) the electronic device, the computer network device may establish a connection with the electronic device using the first WLAN (operation 1714). Then, the computer network device may confirm, with the computer system, that a binding (such as an entry in a look-up table) between a passphrase associated with the electronic device and the second WLAN exists (operation 1716). Alternatively, when the binding does not exist (operation 1716), the computer network device may establish the binding in the computer system (operation 1718). Next, the computer network device may perform a BSS transition (operation 1720) of the electronic device from the first WLAN to the second WLAN. For example, the computer network device may transmit, to the electronic device, a recommendation to transition from the first WLAN to the second WLAN.

In some embodiments, the computer network device optionally performs one or more additional operations (operation 1722). For example, when the computer network device receives a probe request, the computer network device may provide a probe response addressed to the electronic device. Then, the computer network device may receives an association request associated with the electronic device. In response, the computer network device may establish the connection with the electronic device using the first WLAN by associating with the electronic device via an association process.

Moreover, the computer network device may update a state entry associated with the electronic device in a state table when the binding is confirmed or is established. Furthermore, the computer network device may communicate the state entry to additional computer network devices in a network. For example, the state entry may be communicated using an L2 broadcast to the additional computer network devices.

Additionally, the connection with the electronic device may established using the first WLAN when the connection includes a first instance of the connection. The computer network device may confirm that an association with the electronic device is the first instance based at least in part on the state entry in the state table. Consequently, when a request to establish a subsequent instance of a connection with the electronic device occurs, the computer network device may establish the subsequent instance of the connection with the electronic device using the second WLAN based at least in part on the state entry in the state table.

Similarly, when the electronic device subsequently associates with one of the additional computer network devices, a connection may be established with the instance of the one of the additional computer network devices using an instance of the second WLAN provided by the instance of the one of the additional computer network devices. Thus, the second WLAN may be used when the electronic device roams from the computer network device to the instance of the one of the additional computer network devices.

Moreover, the second WLAN may use WPA3-SAE.

In some embodiments, the first WLAN and the second WLAN may have the same SSID and different BSSIDs.

Note that the BSS transition may be based at least in part on the association of the electronic device and the computer network device using the first WLAN.

Furthermore, the passphrase may include a DPSK of the electronic device.

Additionally, the confirming of the binding or the establishing of the binding may include the computer system authenticating the electronic device and may occur without the computer system performing a cryptographic calculation or using a single cryptographic calculation.

Figure 18:
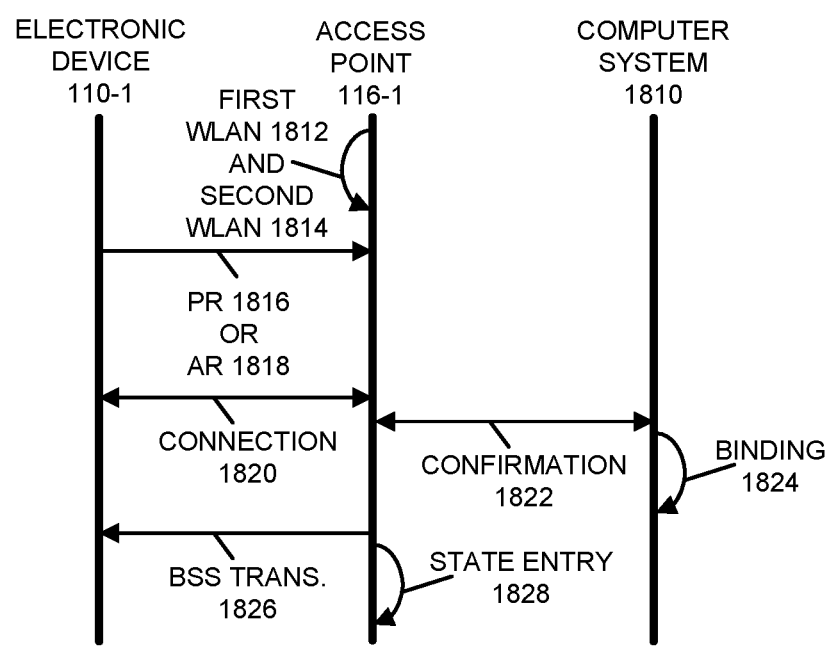
FIG. 18 is a drawing illustrating an example of communication among the electronic devices in FIG. 1 in accordance with an embodiment of the present disclosure.

Embodiments of the communication techniques are further illustrated in FIG. 18, which presents a drawing illustrating an example of communication among electronic device 110-1, access point 116-1 (which is an example of a computer network device) and a computer system 1810 (which may include computer 112, AAA server 130 and/or PM sever 132). In FIG. 18, an interface circuit in access point 116-1 may provide a first WLAN 1812 and a second WLAN 1814, where the first WLAN 1812 uses a WPA2-compatible authentication protocol and the second WLAN 1814 uses a WPA3-compatible authentication protocol.

Then, an interface circuit in electronic device 110-1 may provide a probe request (PR) 1816 or an association request (AR) 1818 to access point 116-1 via an interface circuit in access point 116-1. In response to receiving probe request 1816 or association request 1818, access point 116-1 may establish a connection 1820 with electronic device 110-1 using the first WLAN 1812.

Then, access point 116-1 may confirm 1822, with computer system 1810, that a binding 1824 between a passphrase associated with electronic device 110-1 and the second WLAN 1814 exists (e.g., is included in a look-up table in computer system 1810). Alternatively, when binding 1824 does not exist, access point 116-1 may establish binding 1824 in computer system 1810 (e.g., by having computer system 1810 create an entry in the look-up table).

Next, access point 116-1 may perform a BSS transition 1826 of electronic device 110-1 from the first WLAN 1812 to the second WLAN 1814. For example, access point 116-1 may transmit, to electronic device 110-1, a recommendation to transition from the first WLAN 1812 to the second WLAN 1814.

Moreover, access point 116-1 may update a state entry 1828 associated with electronic device 110-1 in a state table when binding 1824 is confirmed or is established. Furthermore, access point 116-1 may communicate state entry 1828 to other access points 116 in a network.

Consequently, when a request to establish a subsequent instance of a connection with electronic device 110-1 occurs (such as when access point 116-1 or one of the other access points 116 receives another instance of a probe request or an association request, the subsequent instance of the connection with electronic device 110-1 may be established using the second WLAN or another instance of the second WLAN based at least in part on state entry 1828 in the state table.

Figure 19:
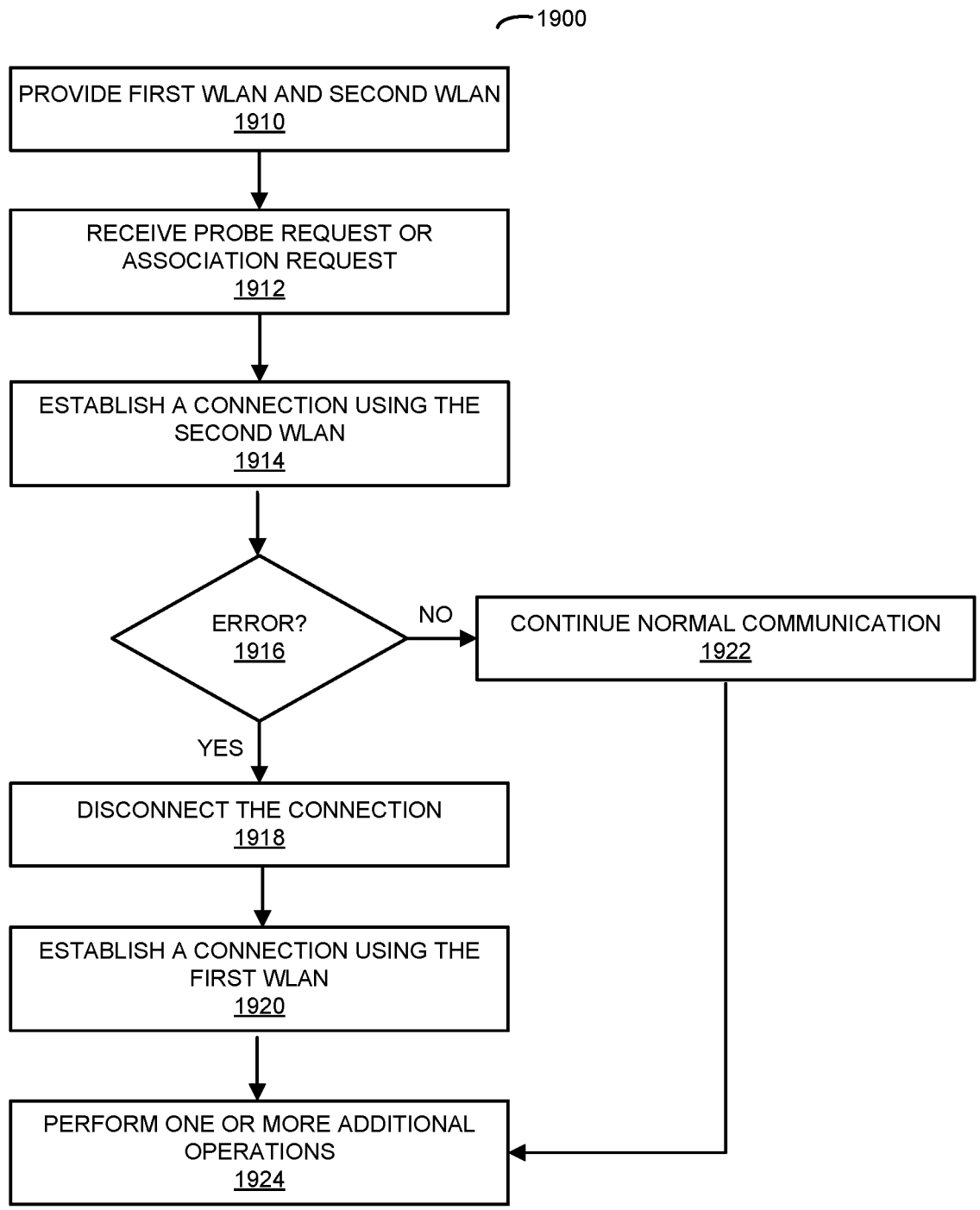
FIG. 19 is a flow diagram illustrating an example of a method for establishing a connection using an access point in FIG. 1 in accordance with an embodiment of the present disclosure.

FIG. 19 presents a flow diagram illustrating an example of a method 1900 for establishing a connection, which may be performed by a computer network device, such as one of access points 116, one of radio nodes 118 or switch 128 in FIG. 1. During operation, the computer network device may provide a first WLAN and a second WLAN (operation 1910), where the first WLAN uses a WPA2-compatible authentication protocol and the second WLAN uses a WPA3-compatible authentication protocol.

Then, the computer network device may receive an association request or a probe request associated (operation 1912) with (or from) an electronic device. Moreover, the computer network device may establish (or attempt to establish) a connection with the electronic device (operation 1914) using the second WLAN. For example, the computer network device may associate with the electronic device using the second WLAN.

When the electronic device gets stuck or an error occurs during the association (operation 1916), the computer network device may disconnect the connection with the electronic device (operation 1918) using a de-authentication process. Next, the computer network device may establish a connection with the electronic device using the first WLAN (operation 1920). (Otherwise (operation 1916), the computer network device may continue normal communication operation with electronic device (operation 1922).)

In some embodiments, the computer network device optionally performs one or more additional operations (operation 1924). For example, the computer network device may perform operations operation 1716, operation 1718 and operation 1720 in FIG. 17.

In some embodiments of method 1700 (FIG. 17) and/or 1900, there may be additional or fewer operations. Furthermore, the order of the operations may be changed, and/or two or more operations may be combined into a single operation.

Figure 20:
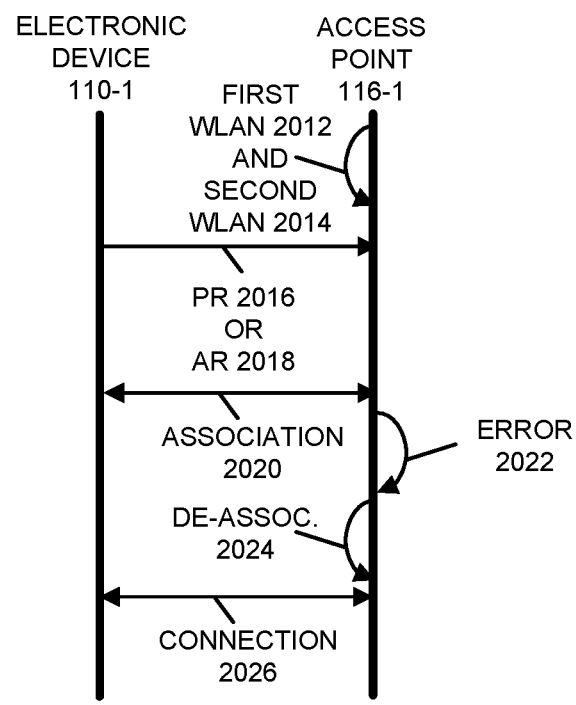
FIG. 20 is a drawing illustrating an example of communication among the electronic devices in FIG. 1 in accordance with an embodiment of the present disclosure.

Embodiments of the communication techniques are further illustrated in FIG. 20, which presents a drawing illustrating an example of communication between electronic device 110-1 and access point 116-1. In FIG. 20, an interface circuit in access point 116-1 may provide a first WLAN 2012 and a second WLAN 2014, where the first WLAN 2012 uses a WPA2-compatible authentication protocol and the second WLAN 2014 uses a WPA3-compatible authentication protocol.

Then, an interface circuit in electronic device 110-1 may provide a probe request (PR) 2016 or an association request (AR) 2018 to access point 116-1 via an interface circuit in access point 116-1. In response to receiving probe request 2016 or association request 2018, access point 116-1 may establish associate 2020 (and, thus, establish a connection) with electronic device 110-1 using the second WLAN 2014.

When electronic device 110-1 and/or access point 116-1 experiences an error 2022 during the association, access point 116-1 may disconnect 2024 the connection with electronic device 110-1 using a de-authentication process. Next, access point 116-1 may establish a connection 2026 with electronic device 110-1 using first WLAN 2012. Moreover, when this occurs, at least some components in FIG. 20 (such as electronic device 110-1, access point 116-1 and computer system 2010) may perform at least some of the operations in FIG. 18, thereby allowing the binding to be established between a passcode of electronic device 110-1 and the second WLAN 2014, and then performing the BSS transition electronic device 110-1 from the first WLAN 2012 to the second WLAN 2014.

While FIGS. 18 and 20 illustrate communication between components using unidirectional or bidirectional communication with lines having single arrows or double arrows, in general the communication in a given operation in this figure may involve unidirectional or bidirectional communication. Moreover, while FIGS. 18 and 20 illustrate operations being performed sequentially or at different times, in other embodiments at least some of these operations may, at least in part, be performed concurrently or in parallel.

We now describe embodiments of an electronic device, which may perform at least some of the operations in the communication techniques. FIG. 21 presents a block diagram illustrating an example of an electronic device 2100 in accordance with some embodiments, such as one of: base station 108, one of electronic devices 110, computer 112, one of access points 116, one of radio nodes 118, switch 128, AAA server 130, DPSK server 610, AAA server 612, PM server 614, user DB 616, one of access points 618, and/or one of end devices 620. This electronic device includes processing subsystem 2110, memory subsystem 2112, and networking subsystem 2114. Processing subsystem 2110 includes one or more devices configured to perform computational operations. For example, processing subsystem 2110 can include one or more microprocessors, graphics processing units (GPUs), ASICs, microcontrollers, programmable-logic devices, and/or one or more digital signal processors (DSPs).

Memory subsystem 2112 includes one or more devices for storing data and/or instructions for processing subsystem 2110 and networking subsystem 2114. For example, memory subsystem 2112 can include DRAM, static random access memory (SRAM), and/or other types of memory. In some embodiments, instructions for processing subsystem 2110 in memory subsystem 2112 include: one or more program modules or sets of instructions (such as program instructions 2122 or operating system 2124, such as Linux, UNIX, Windows Server, or another customized and proprietary operating system), which may be executed by processing subsystem 2110. Note that the one or more computer programs, program modules or instructions may constitute a computer-program mechanism. Moreover, instructions in the various modules in memory subsystem 2112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2110.

In addition, memory subsystem 2112 can include mechanisms for controlling access to the memory. In some embodiments, memory subsystem 2112 includes a memory hierarchy that comprises one or more caches coupled to a memory in electronic device 2100. In some of these embodiments, one or more of the caches is located in processing subsystem 2110.

In some embodiments, memory subsystem 2112 is coupled to one or more high-capacity mass-storage devices (not shown). For example, memory subsystem 2112 can be coupled to a magnetic or optical drive, a solid-state drive, or another type of mass-storage device. In these embodiments, memory subsystem 2112 can be used by electronic device 2100 as fast-access storage for often-used data, while the mass-storage device is used to store less frequently used data.

Networking subsystem 2114 includes one or more devices configured to couple to and communicate on a wired and/or wireless network (i.e., to perform network operations), including: control logic 2116, an interface circuit 2118 and one or more antennas 2120 (or antenna elements). (While FIG. 21 includes one or more antennas 2120, in some embodiments electronic device 2100 includes one or more nodes, such as antenna nodes 2108, e.g., a metal pad or a connector, which can be coupled to the one or more antennas 2120, or nodes 2106, which can be coupled to a wired or optical connection or link. Thus, electronic device 2100 may or may not include the one or more antennas 2120. Note that the one or more nodes 2106 and/or antenna nodes 2108 may constitute input(s) to and/or output(s) from electronic device 2100.) For example, networking subsystem 2114 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 2100 may be adapted or changed using pattern shapers (such as directors or reflectors) and/or one or more antennas 2120 (or antenna elements), which can be independently and selectively electrically coupled to ground to steer the transmit antenna pattern in different directions. Thus, if one or more antennas 2120 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 2100 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 2114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2100 may use the mechanisms in networking subsystem 2114 for performing simple wireless communication between the electronic devices, e.g., transmitting advertising or beacon frames and/or scanning for advertising frames transmitted by other electronic devices as described previously.

Within electronic device 2100, processing subsystem 2110, memory subsystem 2112, and networking subsystem 2114 are coupled together using bus 2128. Bus 2128 may include an electrical, optical, and/or electro-optical connection that the subsystems can use to communicate commands and data among one another. Although only one bus 2128 is shown for clarity, different embodiments can include a different number or configuration of electrical, optical, and/or electro-optical connections among the subsystems.

In some embodiments, electronic device 2100 includes a display subsystem 2126 for displaying information on a display, which may include a display driver and the display, such as a liquid-crystal display, a multi-touch touchscreen, etc.

Moreover, electronic device 2100 may include a user-interface subsystem 2130, such as: a mouse, a keyboard, a trackpad, a stylus, a voice-recognition interface, and/or another human-machine interface. In some embodiments, user-interface subsystem 2130 may include or may interact with a touch-sensitive display in display subsystem 2126.

Electronic device 2100 can be (or can be included in) any electronic device with at least one network interface. For example, electronic device 2100 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 2100, in alternative embodiments, different components and/or subsystems may be present in electronic device 2100. For example, electronic device 2100 may include one or more additional processing subsystems, memory subsystems, networking subsystems, and/or display subsystems. Additionally, one or more of the subsystems may not be present in electronic device 2100. Moreover, in some embodiments, electronic device 2100 may include one or more additional subsystems that are not shown in FIG. 21. Also, although separate subsystems are shown in FIG. 21, in some embodiments some or all of a given subsystem or component can be integrated into one or more of the other subsystems or component(s) in electronic device 2100. For example, in some embodiments instructions 2122 is included in operating system 2124 and/or control logic 2116 is included in interface circuit 2118.

Moreover, the circuits and components in electronic device 2100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 2114 and/or of electronic device 2100. The integrated circuit may include hardware and/or software mechanisms that are used for transmitting wireless signals from electronic device 2100 and receiving signals at electronic device 2100 from other electronic devices. Aside from the mechanisms herein described, radios are generally known in the art and hence are not described in detail. In general, networking subsystem 2114 and/or the integrated circuit can include any number of radios. Note that the radios in multiple-radio embodiments function in a similar way to the described single-radio embodiments.

In some embodiments, networking subsystem 2114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 2122, operating system 2124 (such as a driver for interface circuit 2118) or in firmware in interface circuit 2118. Alternatively or additionally, at least some of the operations in the communication techniques may be implemented in a physical layer, such as hardware in interface circuit 2118.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:
an interface circuit configured to communicate with an electronic device and a computer system;
a processor; and
a memory that stores program instructions, wherein, when executed by the processor, the program instructions cause the computer network device to perform operations, comprising:
providing a first wireless local area network (WLAN) and a second WLAN, wherein the first WLAN uses a Wi-Fi Protected Access 2 (WPA2)-compatible authentication protocol and the second WLAN uses a Wi-Fi Protected Access 3 (WPA3)-compatible authentication protocol;
receiving, associated with the electronic device, an association request or a probe request;
establishing a connection with the electronic device using the first WLAN;
after establishing the connection, confirming, with the computer system, that a binding between a passphrase associated with the electronic device and the second WLAN exists or, when the binding does not exist, establishing the binding in the computer system; and
performing a basic service set (BSS) transition of the electronic device from the first WLAN to the second WLAN.

2. The computer network device of claim 1, wherein the operations comprise updating a state entry associated with the electronic device in a state table when the binding is confirmed or is established.

3. The computer network device of claim 2, wherein the operations comprise communicating the state entry to additional computer network devices in a network.

4. The computer network device of claim 3, wherein the state entry is communicated using a layer-two (L2) broadcast to the additional computer network devices.

5. The computer network device of claim 1, wherein the connection with the electronic device is established using the first WLAN when the connection comprises a first instance of the connection.

6. The computer network device of claim 5, wherein the operations comprise confirming that an association with the electronic device is the first instance of the connection based at least in part on a state entry in the state table.

7. The computer network device of claim 6, wherein, when a request to establish a subsequent instance of a connection with the electronic device occurs, the operations comprise establishing the subsequent instance of the connection with the electronic device using the second WLAN based at least in part on the state entry in the state table.

8. The computer network device of claim 1, wherein the second WLAN uses WPA3-simultaneous authentication of equals (SAE).

9. The computer network device of claim 1, wherein the first WLAN and the second WLAN have a same service set identifier (SSID) and different basic service set identifiers (BSSIDs).

10. The computer network device of claim 1, wherein the BSS transition is based at least in part on an association of the electronic device and the computer network device using the first WLAN.

11. The computer network device of claim 1, wherein the passphrase comprises a dynamic pre-shared key (DPSK) of the electronic device.

12. The computer network device of claim 1, wherein the computer network device comprises an access point.

13. The computer network device of claim 1, wherein the confirming of the binding or the establishing of the binding comprises authenticating, by the computer system, the electronic device and the authentication occurs without the computer system performing a cryptographic calculation or using a single cryptographic calculation.

14. A non-transitory computer-readable storage medium for use in conjunction with a computer network device, the computer-readable storage medium storing program instructions that, when executed by the computer network device, cause the computer network device to perform operations comprising:
providing a first wireless local area network (WLAN) and a second WLAN, wherein the first WLAN uses a Wi-Fi Protected Access 2 (WPA2)-compatible authentication protocol and the second WLAN uses a Wi-Fi Protected Access 3 (WPA3)-compatible authentication protocol;
receiving, associated with an electronic device, an association request or a probe request;
establishing a connection with the electronic device using the first WLAN;
after establishing the connection, confirming, with a computer system, that a binding between a passphrase associated with the electronic device and the second WLAN exists or, when the binding does not exist, establishing the binding in the computer system; and
performing a basic service set (BSS) transition of the electronic device from the first WLAN to the second WLAN.

15. The non-transitory computer-readable storage medium of claim 14, wherein the operations comprise updating a state entry associated with the electronic device in a state table when the binding is confirmed or is established.

16. The non-transitory computer-readable storage medium of claim 15, wherein the operations comprise communicating the state entry to additional computer network devices in a network.

17. A method for establishing a connection, comprising:
by a computer network device:
providing a first wireless local area network (WLAN) and a second WLAN, wherein the first WLAN uses a Wi-Fi Protected Access 2 (WPA2)-compatible authentication protocol and the second WLAN uses a Wi-Fi Protected Access 3 (WPA3)-compatible authentication protocol;

receiving, associated with an electronic device, an association request or a probe request;

establishing the connection with the electronic device using the first WLAN;

after establishing the connection, confirming, with a computer system, that a binding between a passphrase associated with the electronic device and the second WLAN exists or, when the binding does not exist, establishing the binding in the computer system; and performing a basic service set (BSS) transition of the electronic device from the first WLAN to the second WLAN.

18. The method of claim 17, wherein the method comprises updating a state entry associated with the electronic device in a state table when the binding is confirmed or is established.

19. The method of claim 18, wherein the method comprises communicating the state entry to additional computer network devices in a network.

20. The method of claim 17, wherein the connection with the electronic device is established using the first WLAN when the connection comprises a first instance of the connection; and when a request to establish a subsequent instance of a connection with the electronic device occurs, the method comprises establishing the subsequent instance of the connection with the electronic device using the second WLAN based at least in part on a state entry in a state table.

* * * * *